United States Patent
Ukezono

(10) Patent No.: US 9,523,581 B2
(45) Date of Patent: Dec. 20, 2016

(54) USER PORTABLE TERMINAL FOR RETRIEVING TARGET GEOGRAPHICAL INFORMATION USING A USER'S CURRENT LOCATION AND CURRENT AZIMUTH ANGLE AND PROVIDING SUCH TO USER

(71) Applicant: SONO ELECTRONICS CO. LTD., Kariya-shi, Aichi (JP)

(72) Inventor: Kunio Ukezono, Kariya (JP)

(73) Assignee: SONO ELECTRONICS CO., LTD., Kariya-shi (JP)

(*) Notice: Subject to any disclaimer, the term of this patent is extended or adjusted under 35 U.S.C. 154(b) by 212 days.

(21) Appl. No.: 14/412,167

(22) PCT Filed: Jul. 30, 2014

(86) PCT No.: PCT/JP2014/070068
§ 371 (c)(1),
(2) Date: Dec. 30, 2014

(87) PCT Pub. No.: WO2015/019918
PCT Pub. Date: Feb. 12, 2015

(65) Prior Publication Data
US 2016/0258756 A1 Sep. 8, 2016

(30) Foreign Application Priority Data

Aug. 5, 2013 (JP) ................................. 2013-162039
Feb. 24, 2014 (JP) ................................. 2014-033179

(51) Int. Cl.
*G01C 21/20* (2006.01)
*G06F 13/38* (2006.01)
*G06F 17/30* (2006.01)
*G01C 17/00* (2006.01)

(52) U.S. Cl.
CPC ............. *G01C 21/20* (2013.01); *G01C 17/00* (2013.01); *G06F 13/385* (2013.01); *G06F 17/3087* (2013.01); *G06F 17/30241* (2013.01)

(58) Field of Classification Search
CPC ........ G01C 21/26; G01C 17/00; G06F 3/0484
See application file for complete search history.

(56) References Cited

U.S. PATENT DOCUMENTS 6,643,581 B2 * 11/2003 Ooishi ................... G01C 21/26
701/516
8,127,139 B2 * 2/2012 Brundage ........... G06F 21/6209
380/258

(Continued)

FOREIGN PATENT DOCUMENTS

JP H0784308 A 3/1995
JP 2001-074480 A 3/2001

(Continued)

OTHER PUBLICATIONS

Jun. 13, 2016 Extended Search Report issued in European Patent Application No. 14815212.7.

(Continued)

*Primary Examiner* — Thomas Tarcza
*Assistant Examiner* — Alex C Dunn
(74) *Attorney, Agent, or Firm* — Oliff PLC

(57) ABSTRACT

A user portable terminal includes a camera, a GPS receiver for measuring a user's current location, an azimuth angle sensor for measuring an azimuth angle of a user's current line of sight, a memory for storing a plurality of reference areas allocated to target objects on the map and a plurality of tourist information which are correlated with each other, with some of the tourist information, correlated to each of the reference areas, including a plurality of azimuth angle specific tourist information as correlated to a plurality of azimuth angles; and a retrieve module. This retrieve module extracts, from the plurality of reference areas, a reference area containing the user's current location, further extracts, from the plurality of azimuth angle specific tourist information correlated to the extracted reference area, the tourist information corresponding to the user's current azimuth angle as measured, and sends the extracted tourist information to the user.

9 Claims, 25 Drawing Sheets

(56) References Cited

U.S. PATENT DOCUMENTS

| | | | |
|---|---|---|---|
| 8,954,860 B1* | 2/2015 | Hands | G06F 17/30873 715/738 |
| 9,241,240 B2* | 1/2016 | Djabarov | H04W 4/021 |
| 9,262,524 B2* | 2/2016 | Lv | G06F 17/30598 |
| 2007/0276596 A1 | 11/2007 | Solomon et al. | |
| 2008/0059199 A1* | 3/2008 | Hataoka | G01C 21/36 704/275 |
| 2010/0332324 A1 | 12/2010 | Khosravy et al. | |
| 2011/0063301 A1* | 3/2011 | Setlur | G06T 17/05 345/441 |
| 2013/0038635 A1* | 2/2013 | Bales | G01C 21/367 345/660 |
| 2013/0339891 A1* | 12/2013 | Blumenberg | G01C 21/26 715/771 |
| 2014/0195218 A1* | 7/2014 | Takaoka | G06F 17/289 704/2 |

FOREIGN PATENT DOCUMENTS

| | | |
|---|---|---|
| JP | 2002229992 A | 8/2002 |
| JP | 2003-177033 A | 6/2003 |
| JP | 2004062428 A | 2/2004 |
| JP | 2005134242 A | 5/2005 |
| JP | 2005150941 A | 6/2005 |
| JP | 2006-292402 A | 10/2006 |
| JP | 2010-139475 A | 6/2010 |
| JP | 2010-203934 A | 9/2010 |
| JP | 2012-088214 A | 5/2012 |
| JP | 2013-140171 A | 7/2013 |

OTHER PUBLICATIONS

Bi-Cheng Zhao et al., Mobile Landmark Guide System based on LOD and SURF, article, 2012, pp. 815-819.

Anish Thomas et al., Azimuth Based Localization for Mobile Phones, article, 2011, pp. 71-76.

Christopher Barhold et al., Evaluation of Gyroscope-embedded Mobile Phones, article, 2011, pp. 1632-1638.

May 12, 2015 Office Action issued in Japanese Patent Application No. 2014-101013.

Sep. 9, 2014 Search Report issued in International Application No. PCT/JP2014/070068.

* cited by examiner

FIRST EXAMPLE OF CLUSTER DATA (a)

| BLOCK | PARTITION AREA | CLUSTER | |
|---|---|---|---|
| | | ELEMENT DATA SET | |
| | | REFERENCE AREA | TOURIST INFORMATION SET |
| No.1 | D1 | | |
| | | | |
| | | | |
| | | | |
| | | | |

(b)

CLUSTER

PARTITION AREA D1

SECOND EXAMPLE OF CLUSTER DATA (a)

| BLOCK | PARTITION AREA | CLUSTER ||
| | | ELEMENT DATA SET ||
| | | REFERENCE AREA | TOURIST INFORMATION SET |
|---|---|---|---|
| No.1 | D1 | | |
| | | | |
| | | | |
| No.2 | D2 | | |
| | | | |
| | | | |
| No.3 | D3 | | |
| | | | |
| | | | |
| | | | |

TERMINAL DATA BASE

| REFERENCE AREA | | TOURIST INFORMATION SET |
|---|---|---|
| (x1, y1) | (x2, y2) | |
| | | |
| | | |
| | | |
| ⋮ | ⋮ | ⋮ |

FIG. 11

| BLOCK | PARTITION AREA | CLUSTER |||||||||
|---|---|---|---|---|---|---|---|---|---|
| | | ELEMENT DATA SET |||||||||
| | | REFERENCE AREA | TOURIST INFORMATION SET |||||||
| | | | abc |||||||
| | | | 0° | 45° | 90° | 135° | 180° | ... | 315° |
| No.1 | D1 | | | | | | | | |
| | | | | | | | | | |
| | | | | | | | | | |
| | | | | | | | | | |
| | | | | | | | | | |

FIG. 15
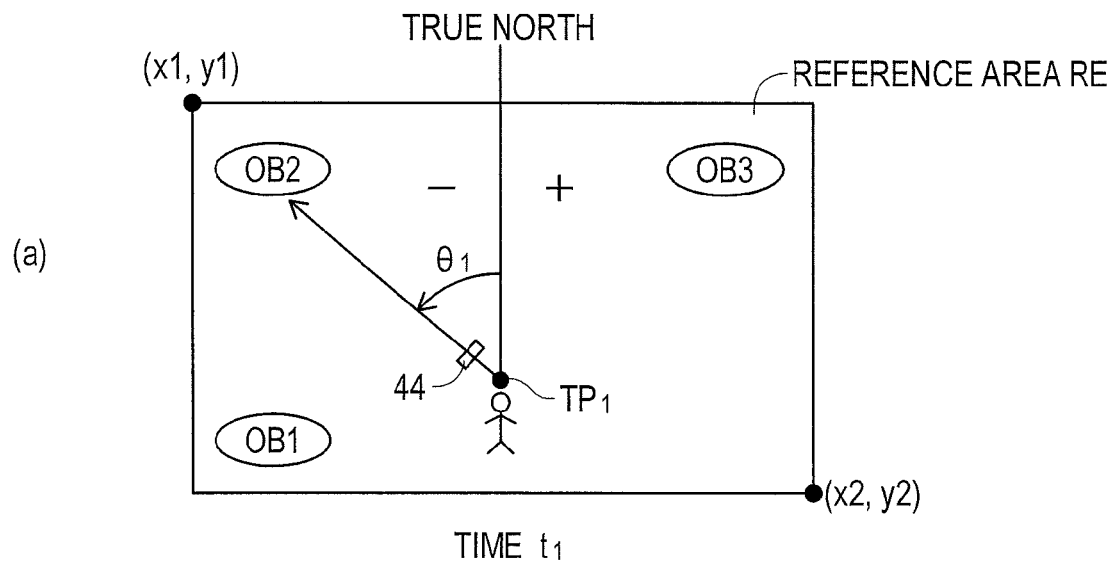
(a) TIME $t_1$
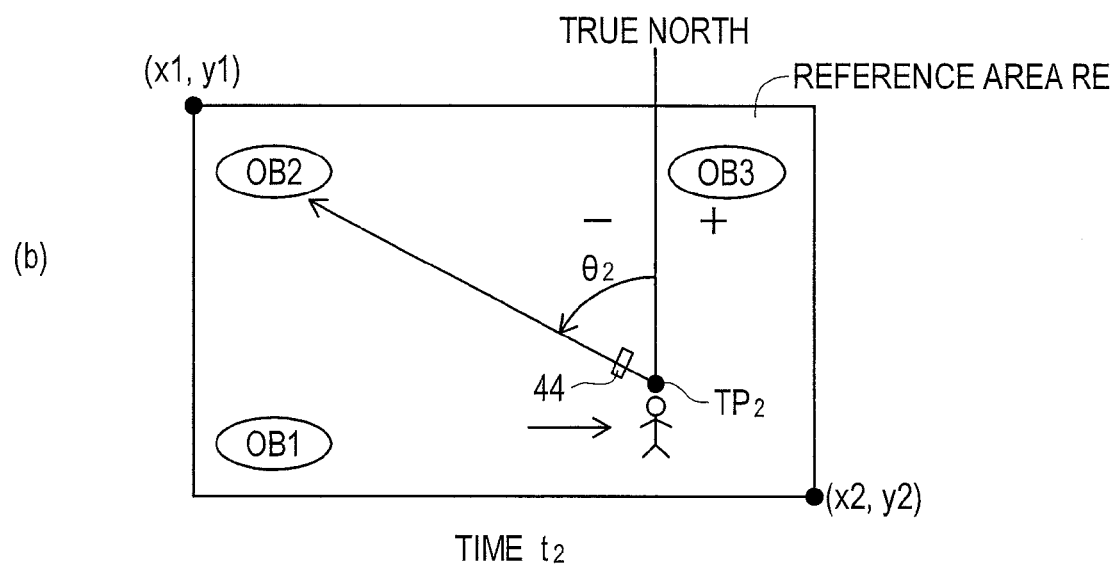
(b) TIME $t_2$

FIG. 18

TERMINAL DATA BASE

| REFERENCE AREA | | TARGET OBJECT SPECIFIC TOURIST INFORMATION SET | | | | |
|---|---|---|---|---|---|---|
| (x1, y1) | (x2, y2) | | | | | |
| | | $OB_1$ | $RP_1(x,y)$ | $TI_1$ | $\Psi_1$ | $D_1$ |
| | | $OB_2$ | $RP_2(x,y)$ | $TI_2$ | $\Psi_2$ | $D_2$ |
| | | $OB_3$ | $RP_3(x,y)$ | $TI_3$ | $\Psi_3$ | $D_3$ |
| | | | | | | |
| | | | | | | |
| | | | | | | |
| | | | | | | |
| | | | | | | |
| | | | | | | |
| ⋮ | ⋮ | ⋮ | ⋮ | ⋮ | ⋮ | ⋮ |

USER PORTABLE TERMINAL FOR RETRIEVING TARGET GEOGRAPHICAL INFORMATION USING A USER'S CURRENT LOCATION AND CURRENT AZIMUTH ANGLE AND PROVIDING SUCH TO USER

TECHNICAL FIELD

The present invention relates to a technology for retrieving geographical information based on and suitable for a user's location on a map, more specifically, a technology for retrieving tourist information based on and suitable for a user's location on the map and providing such to a user.

In recent years, many countries have been experiencing a strong tendency to become tourist-oriented countries. Becoming a tourist-oriented country is an important issue from the point of view of encouraging the revival of a nation as well as invigoration of local communities and the tourist industry could become one major industry in each country.

To achieve this, development of infrastructures for tourist areas as well as improvement of services provided to tourists become very important too.

Development of infrastructures may include for instance addition/development of access to tourist areas as well as addition/development of amenities for tourist areas.

On the one hand, improvement of services may include advertising of tourist areas to the people who live in other areas, wide distribution of tourist guides as well as maps to tourists in tourist areas, as well as wide distribution/diffusion of guide information with respect to suggestions for recommended tours for sightseeing a plurality of spots in a tourist area, and with respect to various target objects in the tourist area specifically sightseeing resources (for instance, buildings, exhibits, cityscape, land forms (mountains, sea, rivers, lakes, straits, valleys, plains, harbors, etc.), animal life, vegetable life, historical sites, places of scenic beauty, traditional arts, folklore, events, etc.) which are specific to that area.

Thus, wide diffusion of geographical information with respect to tourist areas, historical/scientific information with respect to the respective target objects within the tourist areas, information regarding tourist routes as well as information on tourist valuation of such tourist areas (hereinafter collectively referred to as "tourist information") becomes very important in revitalizing tourist industry. The tourist information is provided to the tourists in the form of text, image (still image, video picture) or voice, etc.

On the other hand, thanks to the rapid progress of communication technology, it is common sense for tourists to travel while carrying a communications device capable of communication with the outside. Such communications devices are also referred to as user portable terminals and are classified into portable telephones, smart phones, PDAs, tablet PCs, etc. Also, it is very common for this type of communications devices to have a built-in camera function or a positioning function (for instance, GPS function, etc., location measurement function, azimuth angle measurement function, attitude measurement function).

User portable terminals suitable for image capturing in tourist areas have already been proposed; one such example is disclosed in Patent Literature 1. The user portable terminal disclosed in Patent Literature 1 has a communication device, a digital camera, and a GPS receiver which receives a plurality of radio waves from a plurality of man-made satellites to detect its current location.

In this user portable terminal, image data captured by the digital camera is acquired each time the user presses the shutter button and location information of the user portable terminal is acquired from the GPS receiver. Furthermore, a data file is created, with the acquired image data having an image data number affixed thereto. In addition, a header file is generated with the acquired location information having the image data number affixed thereto. The header file thus generated is combined with the data file and is then sent to the other party using the communication device.

As described above, in recent years, the use of user portable terminals has made it possible for tourists to receive useful tourist information from the outside as needed.

Nevertheless, the amount of tourist information which can be accessed by a tourist using a user portable terminal is enormous. Thus, when the tourist has to retrieve tourist information by selecting a retrieve key himself/herself and entering the information in the user portable terminal by himself/herself, the retrieval operation takes time and effort and is therefore inconvenient. Furthermore, selection of an incorrect retrieval key can make it impossible to retrieve the appropriate tourist information.

Thus, in order to provide an improved user portable device which is easy to use by a user, in this case a tourist, it is necessary to develop a technology for retrieving local tourist information suitable for the current tourist area, which is either completely or partially automatic, by eliminating the user's involvement as much as possible.

In this context, a user portable terminal for automatically retrieving local information suitable for a user's current location has already been proposed and one example thereof is disclosed in Patent Literature 2.

When a user carrying a user portable terminal as disclosed in Patent Literature 2 desires to acquire information with respect to a specific structure, he/she points the user portable terminal towards that specific structure and, while in that state, makes an inquiry to a server. In response to such inquiry, the user portable terminal measures its own current location and furthermore, measures its own current azimuth angle. Then, this user portable terminal sends information including the current location and current azimuth angle thus measured to the server.

Thereafter, the server determines a line of sight showing the user's current location and orientation on a map based on the information thus received. Further, the server calculates geometrically whether the line of sight thus determined and each of a plurality of structures expressed by land record data intersect each other and then infers a structure from the plurality of structures which intersects the line of sight as the structure the user is observing at present. Furthermore, the server acquires attribute information corresponding to the inferred structure from a separate server and sends the attribute information thus acquired to the user portable terminal.

Then, the user portable terminal displays the attribute information thus received from the server onto a screen together with an image showing the structured that is being captured.

[Patent Literature 1] Japanese Patent Application Laid Open No. Hei 7-84308

[Patent Literature 2] Japanese Patent Application Laid Open 2005-134242

DISCLOSURE OF THE INVENTION

Problems to be Solved by the Invention

According to the conventional technology described in Patent Literature 1, when used in a tourist area, the user portable terminal measures automatically, in response to a tourist's image capture operation, only the current location of the tourist on the map and therefore, it is impossible to automatically acquire tourist information suitable for the current location.

According to the technology described in Patent Literature 2, a server needs to carry extensive geometrical computations using land record data to retrieve attribute information for the target objects the user currently shows interest in. This increases the computation load on the server and therefore computation time is long.

Furthermore, according to the conventional technology described in Patent Literature 2, a user portable terminal needs to communicate with a server each time it requires the server to retrieve target information, which increases communication frequency with the user portable terminal. This is likely to increase the occurrence of events where the user portable terminal is unable to acquire target information due to communication failure.

In this context, the present invention has been made in view of the problems discussed above and proposes a technology of retrieving tourist information suitable for a user's current location on a map and providing such to a user, as one example of a technology for retrieving geographical information (for instance, tourist information describing the tourist area, evacuation site information for visual guidance to a target evacuation site, etc.) suitable for a user's current location on the map and providing such to the user. This technology thus makes it easy to answer some demands such as the desire to acquire more accurate target tourist information, and the desire to retrieve target tourist information while reducing computation load on the user portable terminal as well as the degree of dependence on communication with the server.

Means for Solving the Problems

The following aspects can be considered with respect to the present invention. Each aspect is described in a separate paragraph, with each paragraph being numbered and numbers of other paragraphs being quoted as required. This is for the purpose of facilitating understanding of a portion of the technical features and combinations thereof as employed by this invention. The technical features as well as combinations thereof as employed by this invention should not be construed as being limited to the following aspects. Specifically, while not being mentioned in the following aspects, it should be construed that this does not prevent extraction and employment of the technical features described in this description as technical features of the present invention, as appropriate.

Furthermore, each paragraph is described while quoting a number(s) of another(other) paragraph(s), however this is not necessarily construed as impeding separation of the technical features described in each paragraph from the technical features described in the other paragraph(s) for independent use. This should be construed as being possible to use the technical features described in each paragraph independently as appropriate, in accordance with their nature.

(1) To achieve the object of the present invention, there is provided a user portable terminal for retrieving tourist information based on a current location of a user and providing such to the user, comprising:

a camera for capturing an image of a target object;

a measuring sensor for measuring the current location of the user on a map as a user's current location;

an azimuth angle sensor for measuring an azimuth angle of a user's current line of sight on the map as a user's current azimuth angle;

a memory capable of storing a plurality of tourist information and a plurality of reference areas allocated to a plurality of target objects on the map which are correlated with each other, wherein from the plurality of tourist information, tourist information which is correlated to each of the plurality of reference areas includes a plurality of azimuth angle specific tourist information correlated to a plurality of azimuth angles; and a retrieving unit adapted for retrieving the memory using the user's current location which is measured by the measuring sensor as a search key, and then extracting, from the plurality of reference areas, a reference area where the user's current location is found, then extracting, from the plurality of azimuth angle specific tourist information which are correlated with the reference area which is extracted, an azimuth angle specific tourist information corresponding to the user's current azimuth angle, and finally providing the azimuth angle specific tourist information which is extracted to the user.

According to this user portable terminal, the relationship of inclusion between the user's current location and the plurality of reference areas is considered in the retrieval of target tourist information. When using this user portable terminal, a simple calculation suffices to determine the inclusion relationship, without any need to carry out complex geometrical computation using geographical data. Thus, use of this user portable terminal makes it easy to retrieve the target tourist information with a small calculation load.

Furthermore, this user portable terminal makes it possible to acquire the target tourist information by retrieving its own memory. Thus, according to this user portable terminal, information required for future retrievals is once downloaded from the server and then stored at least temporarily in its memory, and as long as the stored information is still valid, communication with the server is no longer required for each retrieval operation. As a result, this user portable terminal relies considerably less on communication with the server for the retrieval operation.

Furthermore, in this user portable terminal, both the user's current location and the current azimuth angle are thus used to retrieve the target tourist information and provide it to the user. However, retrieval of the target tourist information when using the two items of geometrical information including the current location and the current azimuth angle does not occur straight away; it occurs in stages.

More specifically, with this user portable terminal, first, the user's current location is used to extract a reference area suitable for this current location. Next, the user's current azimuth angle is used to extract, from the plurality of azimuth angle specific tourist information which were correlated in advance with the extracted reference area, the azimuth angle specific tourist information suitable for that current azimuth angle.

Specifically, with this user portable terminal, first, a first refinement operation is carried out with respect to all the reference areas (specifically, those corresponding to all azimuth angle specific tourist information as well as those corresponding to all target objects) using the user's current location as a parameter. Then, a second refinement operation is carried out only with respect to the one reference area (specifically, which corresponds to a part of the plurality of azimuth angle tourist information and corresponds to a part of the plurality of target objects) obtained in the first search refinement using the user's current azimuth angle.

As a result, for instance, this user portable terminal makes it possible to carry out data entry tasks such as addition, deletion, updating of tourist information by sharing such tasks amongst the reference areas. Thus, for instance, such data entry tasks can be carried out simultaneously in parallel with respect to a plurality of reference areas, which makes it easy to improve working efficiency.

Further, when there is one operator, he/she can carry out tasks focusing on only one reference area, and thus the amount of data to be handled decreases compared to the case where data for all the reference areas (specifically, all the candidate tourist information) is handled at one time. It is thus easy for the operator to focus on carrying out the data entry tasks, and in addition, it is easy to carry out the data entry tasks without any mistakes.

In one aspect of this user portable terminal, the retrieving unit is configured so as comprise: a measuring unit for measuring a user's current location and a user's current azimuth angle in response to an image capture operation; an extraction unit for extracting a reference area suitable for the user's current location in response to the same image capture operation; and a provision unit for extracting azimuth angle specific tourist information suitable both for the user's current location and the user's current azimuth angle through the medium of the extracted reference area and providing such to the user in response to the same image capture operation.

Specifically, according to this aspect, a series of operations including measurement of the user's current location and current azimuth angle, retrieval of tourist information suitable for both measurement results and provision of the retrieved tourist information to the user are initiated automatically in response to the user's image capture operation.

Here, in general, immediately after the user captures the image of a specific target object as a photographic subject, he/she may want to acquire simultaneously information (for instance, historical information, other tourists' comments with respect to that target object, other target objects historically related to the relevant target object, etc.) correlated with the captured target object.

On the other hand, according to this aspect, the user can acquire tourist information suitable both for the current location and current azimuth angle, specifically, tourist information suitable for that tourist area or target object simply by indicating his/her intent to capture a random target object found in a random tourist area as a photographic subject without voluntarily requesting such.

Further, in general, when two physical quantities including the user's, more specifically the user portable terminal location and azimuth angle on the map are compared to each other, the user's location is static, whereas the user's azimuth angle is dynamic. This is because the user's azimuth angle is very sensitive to changes in the user's attitude (line of sight).

Accordingly, the measured value for the user's location is highly reliable irrespective of the measurement period, whereas the measured value of the azimuth angle in the user's direction of line of sight (hereinafter referred to simply as "user's azimuth angle") varies greatly depending on the measurement period.

Also, once the user anticipates a state of capturing an image of a specific photographic subject with a camera, the user's azimuth angle reflects solidly the orientation of the specific photographic subject with respect to the user at the time of or immediately after the user's image capture operation.

In particular, in tourist areas, such photographic subject is a target object the tourist is watching, and it is highly likely that the tourist may show a strong interest in information, specifically tourist information relating to the target object. Nonetheless, even if the user's azimuth angle only is clear, but the user's location remains unclear, it is still difficult to identify the position of the photographic subject that the tourist is watching.

On the other hand, according to this aspect, the user's location and azimuth angle at the time of the image capture operation are used to infer the target object that the tourist is watching with high accuracy.

Throughout the entire text of the present description, the term "image capture operation", insofar as there is no particular remark otherwise stated, typically includes, for instance, but is not limited to, an operation wherein the user operates a real or virtual shutter button, an operation wherein the user taps the screen of the user portable terminal, etc.

(2) There is provided the user portable terminal according to (1), wherein an azimuth angle correlated with each of the plurality of azimuth angle specific tourist information and stored in the memory is defined as an azimuth angle at a location of a corresponding target object with respect to the user's current location.

(3) There is provided the user portable terminal according to (1) or (2), wherein an azimuth angle correlated with each of the plurality of azimuth angle specific tourist information and stored in the memory is defined as a static azimuth angle which does not change in spite of a change in the user's current location in time.

(4) There is provided the user portable terminal according to (3), wherein the static azimuth angle is an azimuth angle at a location of a corresponding target object with respect to the user's current location, and irrespective of the user's current location, in the case it is assumed that the user watches the corresponding target object from a set location within a reference area including the user's current location, it is defined as an azimuth angle which is acquired with respect to the direction of a user's line of sight.

(5) There is provided the user portable terminal according to (1) or (2) wherein the azimuth angle correlated with each of the plurality of azimuth angle specific tourist information and stored in the memory is defined as a dynamic azimuth angle which changes according to a change in the user's current location in time.

(6) There is provided the user portable terminal according to (5), wherein the dynamic azimuth angle is an azimuth angle at a location of a corresponding target object with respect to the user's current location, and irrespective of a user's current direction of line of sight, in the case it is assumed that the user watches the corresponding target object from the user's current location, it is defined as an azimuth angle which is acquired with respect to the direction of the user's line of sight.

(7) There is provided the user portable terminal according to (6), wherein:

each of the plurality of target objects is allocated degrees of longitude and latitude showing one reference point for identifying its location on the map;

the user's current location is measured using the degrees of longitude and latitude on the map; and the retrieving unit comprises:

a dynamic azimuth angle calculation unit for calculating the dynamic azimuth angle for each of the plurality of target objects based on a geometrical relationship between the degrees of longitude and latitude of the user's current location and the degrees of longitude and latitude of the reference point for each of the plurality of target objects, and then storing the dynamic azimuth angle which is calculated and which is correlated to each of the plurality of target objects, in the memory; and a provision unit for extracting, from the plurality of target objects correlated with the reference area which is extracted, the target object which is stored in the memory while being correlated with the dynamic azimuth angle which has a margin of error with the user's current azimuth angle which is measured that is within a set range, and providing the azimuth angle specific tourist information corresponding to the target object which is extracted to the user.

According to this user portable terminal, the azimuth angles of each of the plurality of target objects which are stored in the memory are updated dynamically so as to follow the user's movement (for instance, on foot or by vehicle (for instance, car, bus, train, ship, airplane, etc.) on the map. As a result, if the user is actually watching any of the target objects on the map which are stored in the memory, the user's current azimuth angle and the azimuth angle which is correlated with the current target object and then stored in the memory will coincide with each other accurately irrespective of the user's location on the map. Thus, with this user portable terminal, the target objects are accurately identified and in addition, it is easy to accurately extract the target tourist information.

(8) There is provided the user portable terminal according to (7), wherein the retrieving unit extracts, from the plurality of target objects correlated with the reference area which is extracted, the target object which is stored in the memory while being correlated with the dynamic azimuth angle which has a margin of error with the user's current azimuth angle which is measured that is within a set range, as a temporary target object, and, if more than one temporary target objects are extracted, selects, from these temporary target objects, the temporary target object with the smallest distance from the user's current location, as a final target object, and then provides to the user azimuth angle specific tourist information corresponding to the final target object which is selected.

According to this user portable terminal, if there are more than one target objects which are stored in the memory in correlation with the dynamic azimuth angle whose margin of error with the user's current azimuth angle which is measured is within a set range, any of the target objects can be selected as the most suitable target object completely automatically without requiring the user's intervention at all, by referring to the distance between the target objects and the user.

(9) There is provided the user portable terminal according to any of (1) through (7), wherein:

the plurality of target objects include a plurality of target objects located inside one azimuth angle zone which extends on the map from the user's current location radially along the direction of the user's current line of sight, and to which a plurality of azimuth angle specific tourist information allocated; and the retrieving unit estimates the azimuth angle zone from the user's current location and the user's current azimuth angle and if a plurality of target objects are present inside the estimated azimuth angle zone, it selects one target object from the plurality of target objects and provides azimuth angle specific tourist information allocated to the one target object to the user.

According to this user portable terminal, if a plurality of target objects are present within the same azimuth angle zone, any of the target objects can be selected as the most suitable target object completely automatically without requiring the user's intervention at all, or quasi-automatically so as to require the user's partial intervention, or otherwise manually.

(10) There is provided a tourist information providing system comprising:

a server;

a plurality of base stations; and a user portable terminal connected to the server so as to allow wireless communication therewith through a nearest base station from amongst the base stations, the user portable terminal being adapted to provide tourist information to a user based on a user's current location;

wherein the user portable terminal comprises:

a camera for capturing an image of a photographic subject in response to a user's image capture operation;

a measuring sensor for measuring a user's current location on a map;

a communication unit for carrying out communication with the server;

a memory capable of storing a plurality of reference areas allocated to a plurality of target objects on the map which are correlated to a plurality of tourist information; and a controller for controlling the measuring sensor, the communication unit and the memory;

wherein the controller comprises:

a measuring unit for measuring the current location using the measuring sensor in response to an image capture operation; and a download request transmission unit for transmitting a download request to the nearest base station via the communication unit in response to the image capture operation;

wherein upon receiving the download request from the user portable terminal via the nearest base station, the server transmits to the user portable terminal one cluster data indicating one cluster from a plurality of clusters obtained by clustering the plurality of reference areas and the plurality of tourist information;

the plurality of clusters are allocated with respect to a plurality of partition areas obtained by dividing an entire area or partial area on the map so that one cluster covers a partition area set representing a group of a plurality of partition areas;

cluster data indicating each cluster is constituted by correlations between a plurality of target objects that the user is scheduled to sightsee in a certain order during a scheduled sightseeing tour and a plurality of tourist information corresponding to these target objects; and in response to the download request, the server transmits to the user portable terminal cluster data, from the plurality of cluster data indicating each of the plurality of clusters, which is correlated wish the nearest base station, with a corresponding partition area set covering a partition area including the current location which is measured, the controller further comprises:

a downloading unit adapted to receive the cluster data which is transmitted via the communication unit, download the cluster data from the server and store it in the memory;

an extraction unit adapted to retrieve in the memory, in response to the image capture operation, using the current location which is measured as a search key and extract from the plurality of reference areas, the reference area including the current location which is measured; and a provision unit for providing to the user tourist information, from the plurality of tourist information, which corresponds to the reference area which is extracted in response to the image capture operation.

(11) There is provided the user portable terminal according to (10), wherein the controller further includes an overwriting unit which, once new cluster data is downloaded from the server, overwrites the old cluster data in the memory with new cluster data, and therefore only one cluster data is stored in the memory.

(12) There is provided a user portable terminal which retrieves, from a plurality of evacuation sites on a map, an evacuation site located near a user's current location and displays it for a user to visually help guide the user to a target evacuation site, the user portable terminal comprising:

a measuring sensor for measuring a current location of the user portable terminal on a map as a user's current position;

an azimuth angle sensor for measuring an azimuth angle on the map as a user's current azimuth angle, with the azimuth angle indicating an orientation of the user portable terminal which is the user's travel direction;

a memory capable of storing a plurality of evacuation sites and their respective locations on the map which are correlated to each other;

a display having a screen;

an extraction unit for retrieving in a memory using the user's current location which is measured as a search key and then extracting, from the plurality of evacuation sites, evacuation sites (for instance, evacuation sites located within a set distance from the user's current location which is measured) which satisfy conditions set in advance (for instance, geographical conditions, conditions relative to the user's current location which is measured), as a plurality of candidate evacuation sites;

a first calculation unit for calculating a relative location of the locations of the plurality of candidate evacuation sites which are extracted on the map with respect to the user's current location, based on the user's current azimuth angle, the user's current location and a plurality of locations on the map which are stored in the memory in correlation with the plurality of candidate evacuation sites which are extracted;

a first display unit for displaying, at once, identification information for each of a plurality of candidate evacuation sites which are extracted, on the screen, in such a way that the user's current location coincides with a reference location set on the screen, and the orientation coincides with a reference line set on the screen at a respective relative location calculated with respect to each of the plurality of candidate evacuation sites which are extracted;

a second calculation unit for calculating, once a candidate evacuation site is selected by the user from the plurality of candidate evacuation sites which are displayed, as a target evacuation site, a relative location of the location of the target evacuation site which is selected with respect to the user's current location, based on the user's current azimuth angle, the user's current location and a location on the map which is stored in the memory in correlation with the target evacuation site which is extracted; and a second display unit for displaying, on the screen, identification information for the target evacuation site which is selected, in such a way that the user's current location coincides with the reference location or not, and the orientation coincides with the reference line or not, at the relative location calculated with respect to the target evacuation site which is selected, wherein the second display unit displays how the user gradually gets closer to the target evacuation site location-wise as well as azimuth angle-wise.

(13) There is provided a program to be executed by a computer for actuating the user portable terminal according to any of (1) through (12).

The program according to this paragraph can be construed, for instance, as a combination of instructions to be executed by a computer to perform some functions, or can also be construed not only as a combination of instructions but also as including files and data to be processed in accordance with these instructions. Nevertheless, the program is not limited to this aspect alone.

Also, this program can be executed by a computer independently to achieve an expected objective, or can also be executed by a computer together with other programs to achieve an expected objective. Nevertheless, the program is not limited to this alone. In the latter case, the program according to this paragraph can be designed to use mainly data, however, this is not limited to this aspect alone.

There is provided a recording medium for storing the program according to (14) and (13) in a computer readable format.

A variety of media can be adopted as recording medium, for instance, magnetic recording media such as floppy disk, etc., optical recording media such as CD, CD-ROM, etc., magneto-optic recording media such as MO, nonremovable storage media such as ROM, however, this is not limited to this aspect.

BRIEF DESCRIPTION OF THE DRAWINGS

FIG. 5(a) is a conceptual perspective view illustrating a plurality of reference areas in virtual space. FIG. 5(b) is a conceptual perspective view showing correlations amongst a plurality of target objects from a location point of view with FIG. 5(a) in real space.

FIG. 9 is a conceptual diagram showing one example of how cluster data downloaded from the server at Step S8 shown in FIG. 3 is stored in the terminal data base shown in FIG. 2.

FIG. 11 is a conceptual diagram illustrating one example of how cluster data downloaded from the server to the user portable terminal shown in FIG. 1 is stored in the terminal data base shown in FIG. 2.

FIG. 15(a) describes one example of an environment wherein a user portable terminal according to a second illustrative embodiment of the present embodiment operates. In this environment, at a time $t_1$, the azimuth angle of a stationary target object $OB_2$ with respect to a user's location $TP_1$ is $\theta_1$. On the other hand, FIG. 15(b) shows that in the same operating environment, at the next time $t_2$, the azimuth angle of the same target object $OB_2$ with respect to a user's location $TP_2$ after he/she has changed location is $\theta_2$.

FIG. 18 is a conceptual diagram showing an example of how data is downloaded from the server shown in FIG. 1 to the user portable terminal according to the second embodiment and is then stored in the terminal data base inside the user portable terminal.

DETAILED DESCRIPTION OF THE PREFERRED EMBODIMENTS

Figure 1:
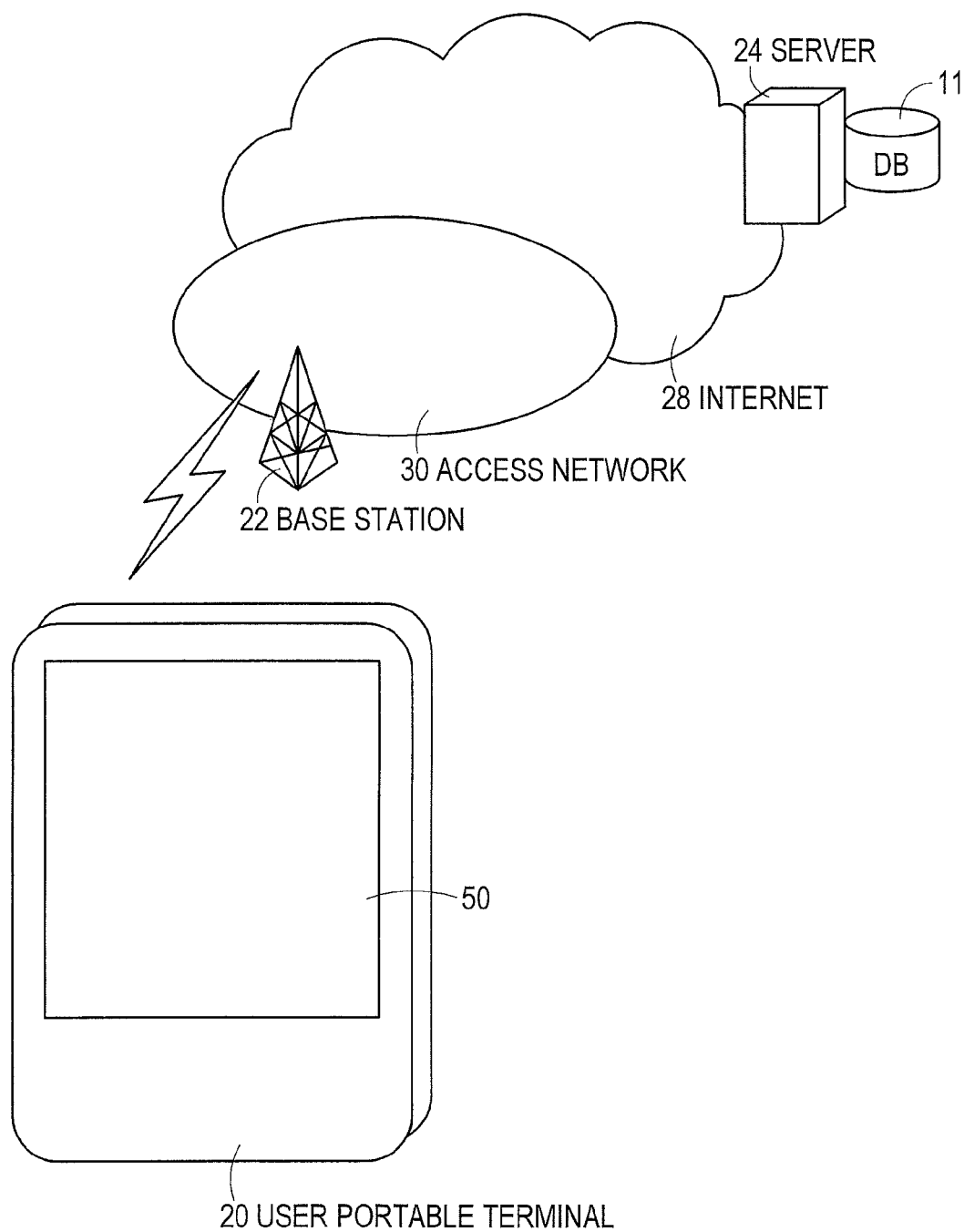
FIG. 1 is a systematic diagram showing a tourist information providing system including a user portable terminal according to an illustrative first embodiment of the present invention.

Hereinafter, a few exemplary and concrete embodiments of the present invention will be described in detail while referring to the drawings.

Description of a First Embodiment of the Invention

FIG. 1 is a systematic diagram showing a tourist information providing system (hereinafter simply referred to as "system") 10 according to an exemplary first embodiment of the present invention.

This system 10 is provided with a plurality of user portable terminals (hereinafter simply referred as "terminals") 20 to be used by a plurality of different users, respectively, a plurality of base stations 22, a server 24 shared by the terminals 20, a data base 26 connected to the server 24, internet 28 as global network and access network 30 as local network. In the present embodiment, each terminal 20 downloads the required information from the server 24 to execute the tourist information retrieval method to be described hereinafter.

Each terminal 20 can connect with server 24 to allow communication therewith through the nearest base station 22 from amongst the plurality of base stations 22, the access network 30 connected to the nearest base station 22 and internet 28 connected to the access network 30. For convenience of explanation, FIG. 1 shows one terminal 20 representing a plurality of terminals 20, and one base station 22 representing a plurality of base stations 22.

Figure 2:
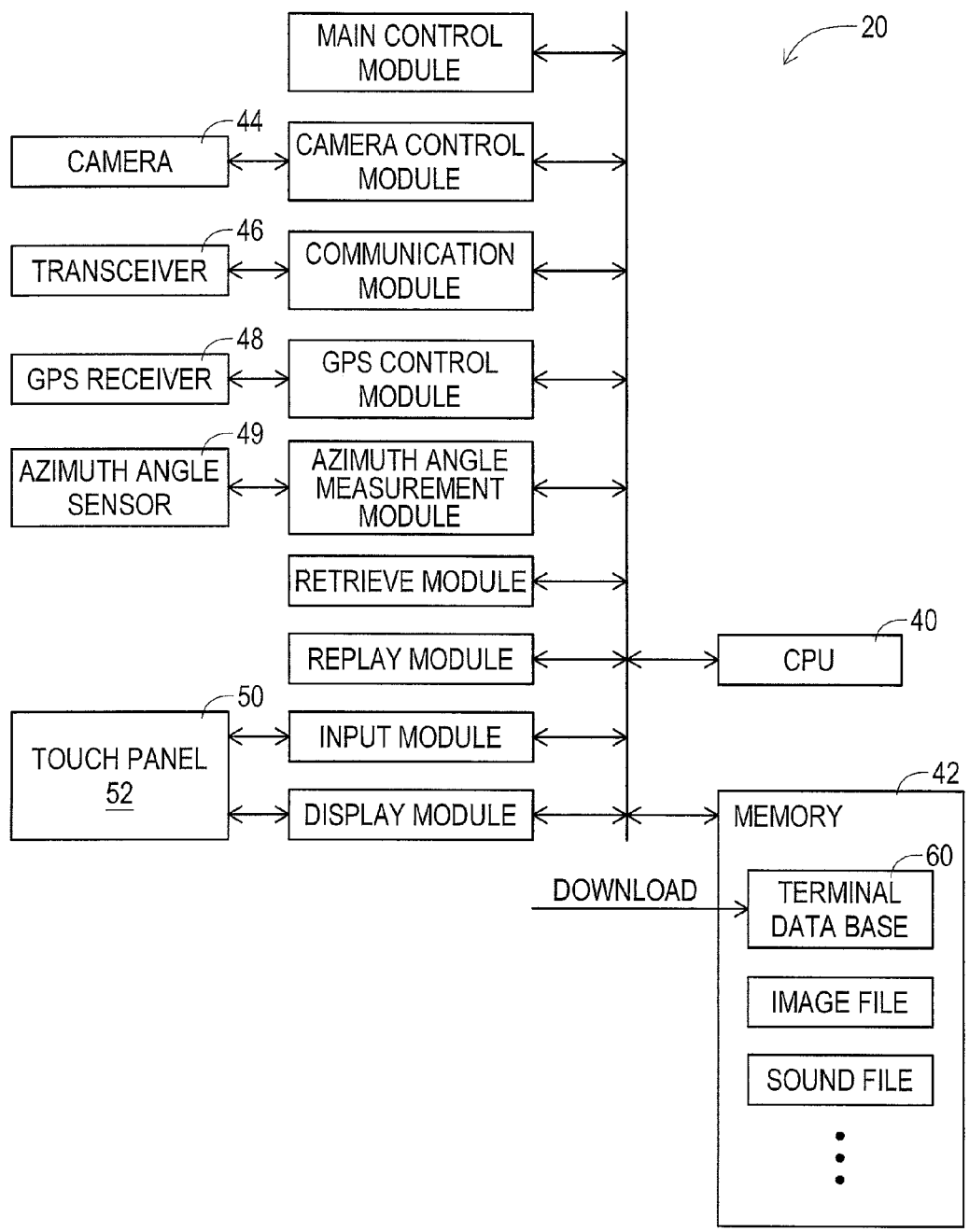
FIG. 2 is a functional block diagram showing the representative user portable terminal illustrated in FIG. 1.

As shown in FIG. 2, the terminal 20 has a CPU (Central Processing Unit) 40 serving as a processor and a memory 42. The terminal 20 may be a portable phone or a smart phone, etc.

The terminal 20 further comprises a digital camera 44, a transceiver 46, a GPS receiver 48 and an azimuth angle sensor 49. The transceiver 46 carries out wireless communication with the outside and the GPS receiver 48 receives a plurality of radio waves from a plurality of man-made satellites (not shown) to detect one's own current location. The azimuth angle sensor 49 is built in the terminal 20 so as to be immovable with respect therewith, and is constituted as a magnetic compass or a gyro-compass, for instance. The azimuth angle is defined for instance as an angle in the horizontal direction with respect to a reference line which is fixed on the globe.

The terminal 20 further has a touch panel 52 with a screen 50 onto which information is visually displayed. The touch panel 52 is adapted for entering commands and information in response to a user's touch operation with respect to the screen 50. The touch panel 52 is therefore an output device as well as an input device.

The memory 42 has a terminal data base 60 for accumulating information (for instance, a plurality of candidate tourist information items, and a plurality of reference areas to be described later) required to retrieve the target tourist information, as well as two storage areas. One storage area is for storing data showing images captured with camera 44 as image files, and the other storage area is for storing data showing sound recorded with a microphone (not shown here, but represents one example of input device) during the image capture operation, as audio files.

Furthermore, memory 42 has a storage area for storing a plurality of modules to be suitably selected and executed by CPU 40. The modules include a main control module for managing the overall terminal 20, a camera control module for controlling the camera 44, a communication module for controlling the transceiver 46, a GPS control module for controlling the GPS receiver 48, an azimuth angle measuring module for measuring the azimuth angle of terminal 20 based on an output signal from the azimuth angle sensor 49, and a retrieve module for retrieving tourist information.

Figure 17:
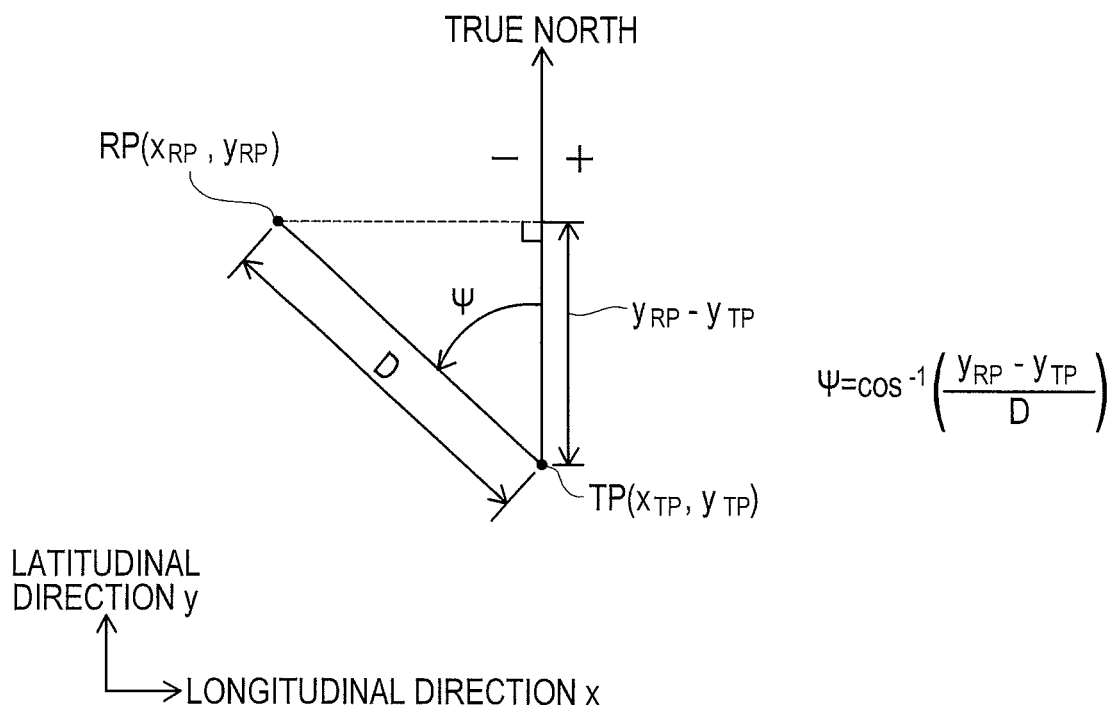
FIG. 17 is a plan view for describing a mechanism wherein the user portable terminal according to the second embodiment calculates the latest value for the azimuth angle $\psi$ using the longitude and latitude degrees of reference point RP for each target object as well as the longitude and latitude degrees of the user's current location TP in order to update the value of the azimuth angle $\psi$ as stored in the reference table.

The GPS receiver 48 and the GPS control module measure the user's current location TP in cooperation with each other using the longitude and latitude degrees (degree of longitude $x_{TP}$, degree of latitude $y_{TP}$) on the map as shown in FIG. 17.

On the other hand, the azimuth angle sensor 49 and the azimuth angle measuring module measure, in cooperation with each other, the azimuth angle for the user's current line of sight as the user's current azimuth angle. The azimuth angle for the user's line of sight is defined as an angle with respect to a reference azimuth in the direction of the user's line of sight. One example of such a reference azimuth is true north, and its angle is measured for instance so that an angle measured in the clockwise direction from the reference azimuth is a positive angle. In the present embodiment, for convenience of description, true north is used as the reference azimuth and a left-handed type north standard coordinate system where an angle measured in the clockwise direction is a positive angle is adopted as shown in FIG. 17. Nevertheless, other coordinate system may be adopted.

As shown in FIG. 2, in addition to the plurality of modules described previously, a replay module, an input module and a display module are also used. The replay module replays the images captured by camera 44 onto the screen 50 and also replays the sound recorded during the image capture operation through speakers, ear-phones or headphones (not shown here, but considered examples of an output device). The input module is adapted for entering commands and information in response to a user's touch operation with respect to the touch panel 52. The display module displays information on the screen 50 of the touch panel 52 as text or images.

Figure 3:
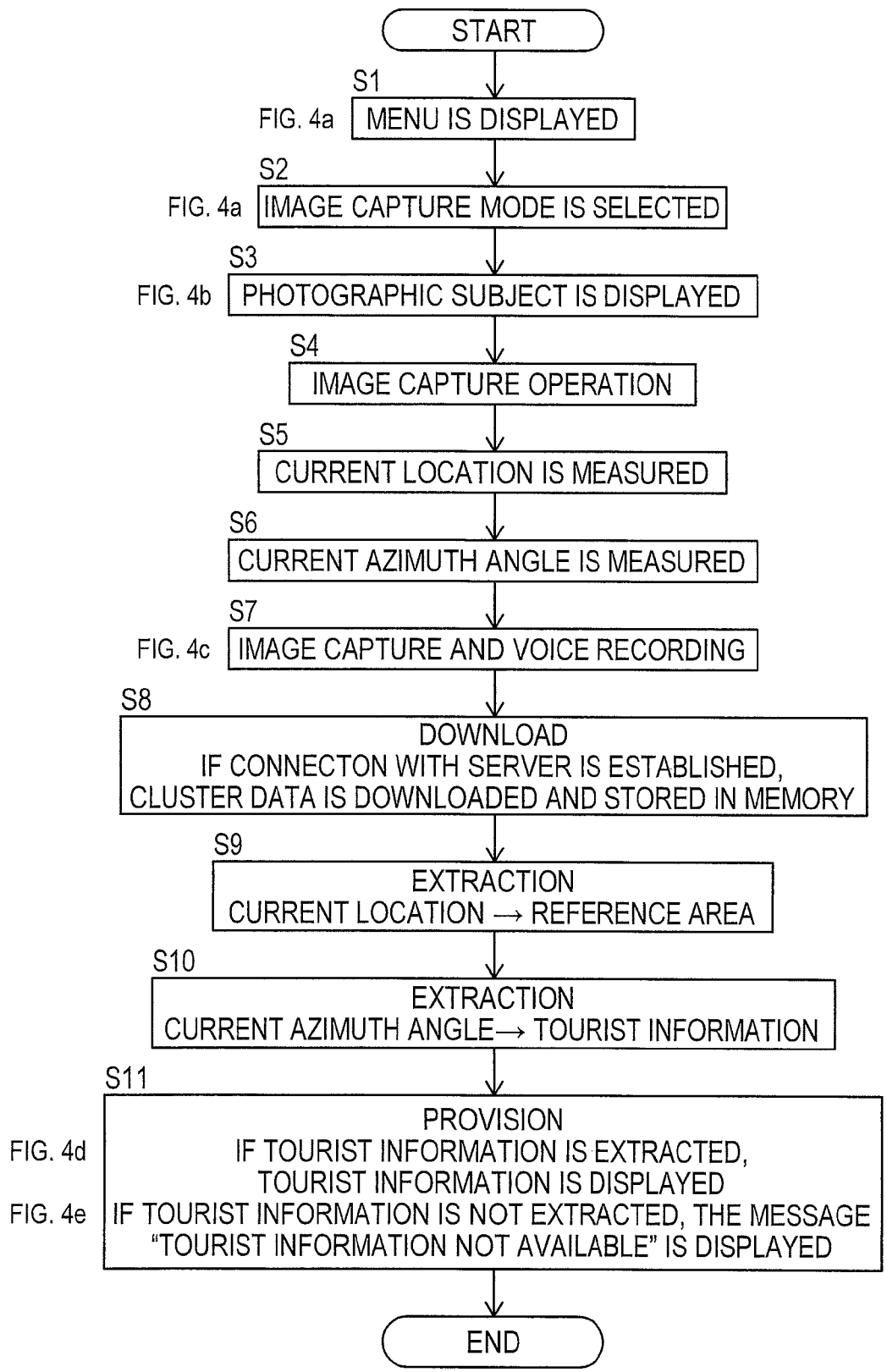
FIG. 3 is a flow chart for illustrating an outline of the overall operation in the user portable terminal as shown in FIG. 1. This is also a conceptual flow chart showing a main section of a main control module as shown in FIG. 2.

FIG. 3 shows a schematic flow chart of the overall operation of the terminal 20. The overall operation of the terminal 20 is realized by the CPU 40 which executes the main control module. Therefore, FIG. 3 shows a conceptual flow chart of the main control module.

Figure 4:
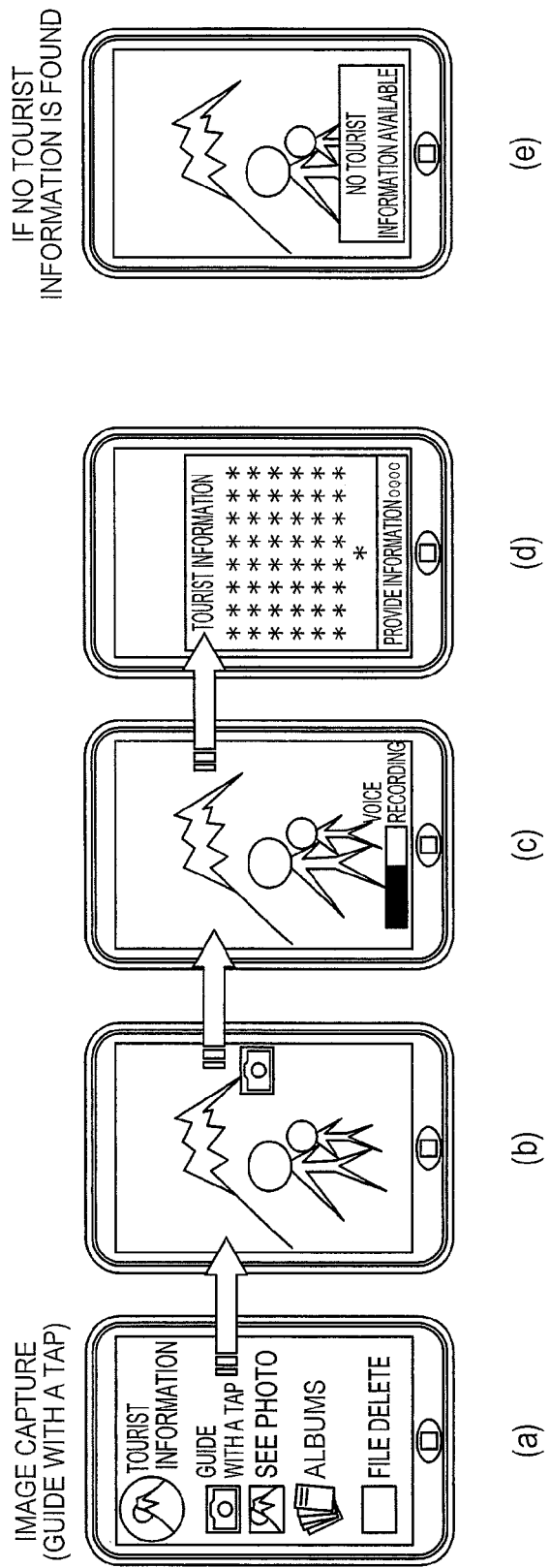
FIGS. 4(a), 4(b), 4(c), 4(d), and 4(e) are front views of the user portable terminal in FIG. 1 showing one example of how the display contents on its screen change in accordance with the processing contents of the user portable terminal.

Once the terminal 20 is activated, first, at Step S1, the operation menu is displayed on the screen 50 as shown in FIG. 4 (a). The operation menu includes icons and/or text showing a plurality of modes to be selected by the user. These modes include a tourist guide mode (shown in the drawing as "Tourist guide"), an image capture mode (shown in the drawing as "Guide with a tap"), a replay mode (shown in the drawing as "See photos"), an albums guide (shown in the drawing as "Albums") and a file delete mode (shown in the drawing as "File delete").

To give an outline of the image capture mode and replay mode, once the image capture mode is selected by the user, image capturing of a photographic subject as displayed on the screen 50 is carried out as sound is recorded in response to an image capture operation. Also, tourist information (for instance, tourist guide) is displayed on the screen 50 in a timely fashion in conjunction with the image capture operation.

On the other hand, if the replay mode is selected by the user, the images captured by the camera 44 are displayed on the screen 50 and at the same time, tourist information (tourist information which was retrieved and stored at the time of image capturing) is replayed on the screen 50 together with replay of audio data.

Returning to FIG. 3, after Step S1, the image capture mode is selected by the user at Step S2 as shown in FIG. 4(a). At Step S3, the current photographic subject is displayed on the screen 50 as shown in FIG. 4(b). At this time, an icon representing the shutter button of camera 44 (virtual shutter button) is also displayed on the same screen 50. Step S2 is executed by activation of the camera control module as shown in FIG. 2.

Next, once the image capture operation is carried out by the user (for instance, the user taps the spot on the screen 50 with the icon showing a shutter button), the image capture operation is detected at Step S4.

Thereafter, at Step S5, the current location of the user on the map is measured using the GPS receiver 48. His/her current location is defined by the degree of longitude x and the degree of latitude y on the map. Step S5 is executed by activation of the positioning module shown in FIG. 2 in response to the image capture operation at this time. The measured current location is then stored in memory 42 for future use.

Next, at Step S6, the user's current azimuth angle on the map is measured using the azimuth angle sensor 49. As described hereinbefore, the current azimuth angle is defined in a left-handed type north reference coordinate system. Step 6 is executed by activation of the azimuth angle measuring module shown in FIG. 2, in response to the image capture operation at this time. The current azimuth angle thus measured is stored in the memory 42 for future use.

Thereafter, at Step S7, as shown in FIG. 4(c), an image of the photographic subject is captured to create relevant image data and the accompanying sound is recorded to create data showing the recorded sound. Step S7 is executed by activation of the camera control module as shown in FIG. 2.

Thereafter, at Step S8, it is determined whether the cluster data (to be described later) required for the current retrieval is already stored in the memory 42 based on the current location as measured. Step S8 is executed by activation of the retrieve module shown in FIG. 2.

If the cluster data required for the current retrieval is not stored in the memory 42, the device will use the transceiver 46 to attempt to connect to the server 24 through the nearest base station 22. Once connection with the server 24 is established, a download request is sent to the server 24 showing that a download of cluster data suitable for the location of the base station 22 employed by terminal 20 is desired from server 24.

In response to this download request, the server 24 sends the cluster data required for the next retrieval to the terminal 20 and as a result, the terminal 20 downloads this cluster data from the server 24 and stores it in the terminal data base 60.

Here, the cluster data download is briefly described and thereafter will be described in more detail while referring to FIG. 7 and FIG. 8.

A plurality of reference areas and a plurality of tourist information items are clustered to obtain a plurality of clusters and, during each communication with the server 24 one cluster data showing one cluster from the plurality of clusters is downloaded from the server 24.

Here, the plurality of clusters are allocated with respect to a plurality of partition areas obtained by partitioning the entire area or only a part of area on the map so that one cluster covers one partition area or otherwise, one cluster covers a group of a plurality of partition areas.

At Step S8, during each communication with the server 24, one cluster data corresponding to that data partition area, from the plurality of partition areas, including the current location as measured is downloaded from the server 24 and is stored in the memory 42.

More specifically, a plurality of base stations 22 are allocated to the server 24 and furthermore, a plurality of cluster data items are correlated with the respective base stations 22 and then stored in the data base 26. Once a download request is received from any terminal 20, the server 24 identifies the base station 22 from where the download request was transmitted and sends the cluster data correlated to the base station 22 as identified and stored in the data base 26 to the terminal 20 through the same base station 22.

Further, at Step S8, it is determined whether the cluster data required for the next retrieval, in other words, cluster data corresponding to the partition area containing the measured current location is already present in the memory 42. If it is not present, communication with the server 24 is allowed, whereas if it is present, communication with the server 24 is blocked.

The above-described cluster data represents data including a plurality of reference areas (to be later described in detail while referring to the drawings) which are allocated in advance to a plurality of target objects on the map (for instance, amenities, structures, exhibits, townscape, geographical features, etc.), respectively and a plurality of tourist information items (for instance, tourist guides, road guides, store guides in the form of text) which are correlated with each other.

Next, at Step S9, the measured current location is retrieved from the terminal data base 60 using it as the search key and as a result, a reference area containing the measured current location is extracted from the plurality of reference areas stored in that terminal data base 60. Step S9 as well is executed by activating the retrieve module shown in FIG. 2.

Thereafter, at Step S10, one item of azimuth angle specific tourist information is extracted from the plurality of azimuth angle specific tourist information items as correlated with the extracted reference area so that the difference between the azimuth angle allocated to this one item of azimuth angle specific tourist information and the current azimuth angle as measured is less than or equal to a predetermined allowable value. As a result, the tourist information to which an azimuth angle, which is closest to the current azimuth angle as measured, is allocated is extracted from amongst the plurality of azimuth angle specific tourist information items as correlated with the extracted reference area as the most suitable tourist information. The relationship between the reference areas and the azimuth angle specific tourist information items is described in detail later while referring to FIG. 10 and FIG. 11.

Next, at Step S11, if the required cluster data is stored in the terminal data base 60, the tourist information from the plurality of tourist information items stored in the terminal data base 60, which corresponds both to the current location and current azimuth angle is provided to the user as shown in FIG. 4(d). More specifically, this tourist information is displayed on the screen 50 in text form. Step S11 as well is executed by activation of the retrieve module as shown in FIG. 2.

On the other hand, if the required cluster data is not stored in the terminal data base 60, a message reading [No tourist information available] is displayed on the screen 50 as illustrated in FIG. 4(e).

Here, the above-described plurality of reference areas will be described in detail while referring to FIG. 5 and FIG. 6, but first a brief description will be given.

The reference areas are each defined by a location, shape and a size of area on the above-mentioned map. Also, there is a geometrical inclusion/non-inclusion relationship between each of these reference areas and other reference areas and the inclusion/non-inclusion relationship shows the inclusion relationship amongst a plurality of target objects.

More specifically, if the inclusion relationship amongst the target objects is expressed as representing the inclusion relationship between the target objects in real space, while the inclusion/non-inclusion relationship between the reference areas is expressed as representing the inclusion relationship between the target objects in virtual space, then the inclusion relationship between the target objects in real space is expressed as the inclusion relationship between the target objects in virtual space which can be freely set. Thus, the desired target objects are retrieved using the inclusion relationship between the target objects in virtual space and in addition, the target tourist information is retrieved as well.

Figure 5:
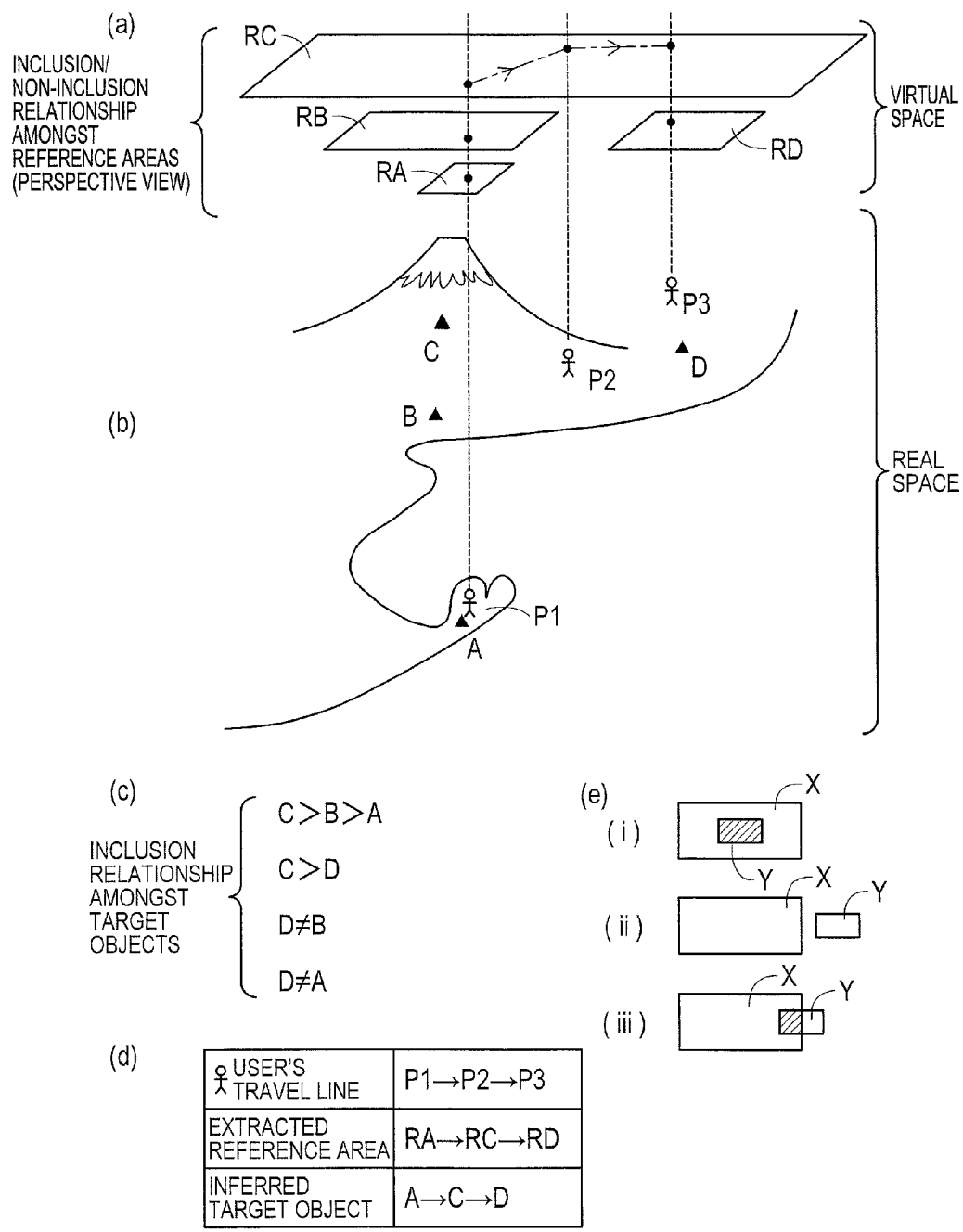
FIGS. 5(a) and 5(b) are both perspective views for giving a conceptual description of correlations between a plurality of reference areas and a plurality of target objects employed in Step S8 as illustrated in FIG. 3. More specifically.
FIG. 5(c) is a diagram showing a formula expressing the inclusion relationship amongst the plurality of target objects shown in FIG. 5(b).
FIG. 5(d) is a diagram illustrating a table showing how the reference area extracted from the plurality of reference areas and the estimated target objects change in time as the user moves around in time, with reference to the examples shown in FIG. 5(a) and FIG. 5(b).
FIG. 5(e) is a plan view for describing three patterns generated by the inclusion/non-inclusion relationship between two reference areas.

In the present embodiment, the above-mentioned inclusion relationship represents a complete inclusion whereby one reference area is geometrically completely contained in another reference area (for instance, this is shown by (i) in FIG. 5 (e)). This means that one of two corresponding target objects belongs to the other area. Also, the above-described non-inclusion relationship represents a complete non-inclusion or complete separation whereby one reference area does not geometrically overlap either partially or entirely with any of the other reference areas (for instance, this is shown by (ii) in FIG. 5(e)). This means that two corresponding target objects do not belong to each other.

However, in the present embodiment, the above-described inclusion/non-inclusion relationship does not include partial inclusion whereby one reference area geometrically overlaps partially with another reference area. (for instance this is shown by (iii) in FIG. 5(e)).

Next, a more concrete description of the plurality of reference areas will be given wile referring to FIG. 5 and FIG. 6.

FIG. 5(a) shows one example of a group of 4 reference areas RA, RB, RC and RD which are present in virtual space and are shown in a perspective view. For convenience of explanation, these reference areas RA, RB, RC and RD are shown as layers, but in reality, there is no height dimension. FIG. 5(b) is a perspective view showing one example of a group of four target objects A, B, C and D as correlated with the four reference areas RA, RB, RC and RD, as they exist in real space.

As shown in the expressions in FIG. 5(c), in the example shown in FIG. 5, target object B belongs to target object C, target object A belongs to target object B and target object D belongs to target object C. However, target object D and target object B do not belong to each other, and similarly, target object D and target object A do not belong to each other either. For convenience of explanation, in a concrete example, target object A is an establishment such as the [Patent Office], target object B is an area such as [Kasumigaseki], target object C is an area such as [Chiyoda-ku] and target object D is an establishment such as [Hibiya Park].

Here, to give a definition of the term "target object", this term is defined to mean a geographical zone on the map as shown in the one example in FIG. 5. When this definition is employed, the target objects and the reference areas corresponding to each other thus define a common geographical region.

Nevertheless, other definitions can be adopted for the term "target object". For instance, as described later, the term "target object" may be used in correlation with azimuth angle specific tourist information or target object specific tourist information. In this case, the term "target objects" can be defined so as to mean the aforementioned tourist attractions (for instance, natural objects, man-made objects) present in one geographical region. In case this definition is employed, the target objects may be present inside a geographical area covered by a reference area extracted in accordance with a user's current location, but they may also be present in a different geographical region.

Thus, in one example shown in FIG. 5, the inclusion relationship amongst target objects A, B, C and D is expressed in terms of the inclusion/non-inclusion relationship amongst the four reference areas RA, RB, RC and RD as shown in FIG. 5(a) which is a perspective view and FIG. 6(a) which is a plan view, respectively.

More specifically, as shown in FIG. 6(b), reference area RC completely encompasses reference area RB, reference area RB completely encompasses reference area RA, and reference area RC completely encompasses reference area RD. However, the relationship between reference area RD and reference area RB is one of complete non-inclusion and similarly, the relationship between reference area RD and reference area RA is one of complete non-inclusion as well.

Each reference area is set to be correlated with a corresponding target object. More specifically, the location, shape as well as size of each reference area can be freely set in advance in accordance with the attributes of a corresponding target object.

Furthermore, more specifically, a larger physical size (for instance, the dimension of a silhouette as obtained when the target object is projected right from above) of the target object (for instance, an establishment, a region) allows for setting of corresponding reference area with a larger surface.

Also, if the physical size of the target object is small, but despite its size, it is a popular site, the corresponding reference area can be set to have a larger size. This is because, potential tourists of the popular target object are likely to be present in an area which is outside the geographical area where the target object is located, and on the other hand, each reference area with a larger surface is more likely to be extracted in each tourist information retrieval step.

SN1401 と同じ文面であったことを確認 (田中)

Also, with respect to a tourist area which is less popular as it is little known at the present time, if there is a desire to increase their popularity and attract more tourists, the corresponding reference area can be set to have a larger size. This is very advantageous for business entities managing or running a specific tourist area or traders managing tourist enterprises in a specific tourist area to increase their ability to attract tourists.

Therefore, according to the present embodiment, the attributes of a target object are reflected in the location, shape and size of the corresponding reference area, which makes it possible to integrate them as attributes for the respective reference area. Also, when retrieving, from the plurality of reference areas, the reference area suitable for the current location of the user, the attributes of the corresponding target object are considered through the medium of location, shape and size of each reference area.

Here, the attributes of the target objects include objective information as well as subjective information. Objective information includes geographical information, historical facts and the like relating to the target object, whereas subjective information includes opinions and comments made by tourists with respect to the respective target object, as well as advertising of the target object by tourist agents and groups.

As a result, according to the present embodiment, in spite of adopting the location-based retrieval method, it is possible to retrieve the target tourist information while taking into consideration additional attributes of the target object, other than geographical location. This helps improve accuracy in the retrieval of target tourist information.

Additionally, in a concrete example, the plurality of reference areas described above are each tourist distribution areas showing a group of a plurality of locations which could be the current location of any random tourist on the map who is sightseeing at present or plans on going sightseeing, shortly after, a corresponding target object(s). Each tourist distribution area can be set so as to be defined by a shape and size which differ from the actual geographical area where the corresponding target object is located.

Figure 6:
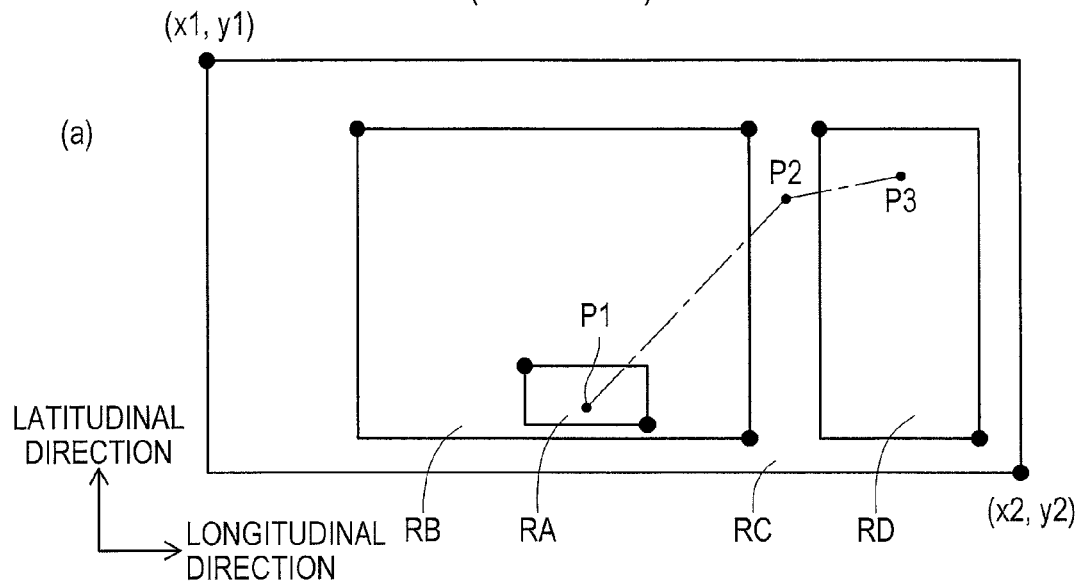
FIG. 6(a) is a plan view showing the plurality of reference areas illustrated in FIG. 5(a).
FIG. 6(b) is a diagram showing a formula for expressing the inclusion/non-inclusion relationship amongst the plurality of reference areas shown in FIG. 6(a).

In the present embodiment, as shown in FIG. 6, for the convenience of calculation, each reference area has a rectangular shape (including a square shape) which is an approximately plane figure and is defined by two sides which are parallel to the longitudinal direction x and two sides which are parallel to the latitudinal direction y on the above-mentioned map. Thus, each reference area is for instance geometrically identified unmistakably by the degree of longitude and the degree of latitude $(x_1, y_1)$ of one position of a pair of diagonal positions in a rectangle, and the degree of longitude and the degree of latitude $(x_2, y_2)$ of the other position.

Alternatively, the shape of each of the reference areas can also be polygonal, with five or more sides. A polygon with a higher number of sides will make it increasingly easier for the designer of system 10 to fully reflect the attributes of the target object in the shape and size of the corresponding reference area. In other words, it will make it easier to increase the amount of information held by the corresponding reference area. Nonetheless, the amount of information held by each of the reference areas and the computation time required at the time of retrieval are in a trade off relationship.

Next, the above-described cluster data will be described in more detail while referring to FIG. 7 and FIG. 8.

Cluster data is unit data which is downloaded, during each one communication with the server 24, from the server 24 to the terminal 20. The amount of cluster data is determined in consideration of transmission speed, as well as processing speed and storage capacity of terminal 20, for instance, so that the time required for download passes smoothly without causing irritation to the user.

On the other hand, the above described plurality of reference areas and plurality of tourist information items which are correlated with each other are allocated to the plurality of partition areas on the above-described map (for instance, map indicating one region of one country, map indicating the full territory of one country, map indicating a plurality of neighboring countries, world map, etc.).

Figure 7:
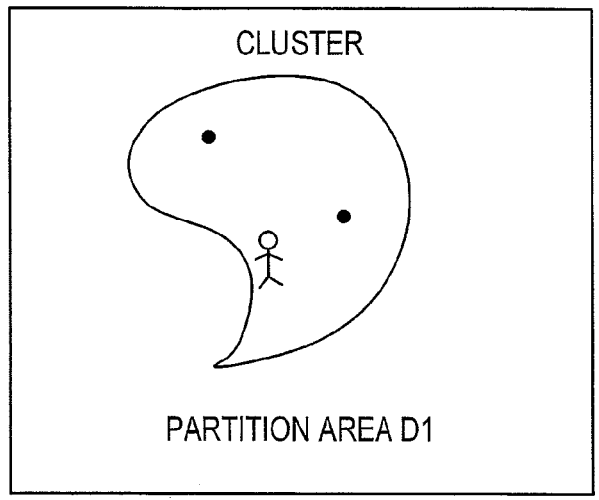
FIG. 7(a) is a conceptual drawing showing a first example of a configuration of cluster data as downloaded from the server at Step S8 as shown in FIG. 3.
FIG. 7(b) is a plan view showing one example of a conceptual location on the map for partition area D1 as illustrated in FIG. 7(a).
Figure 8:
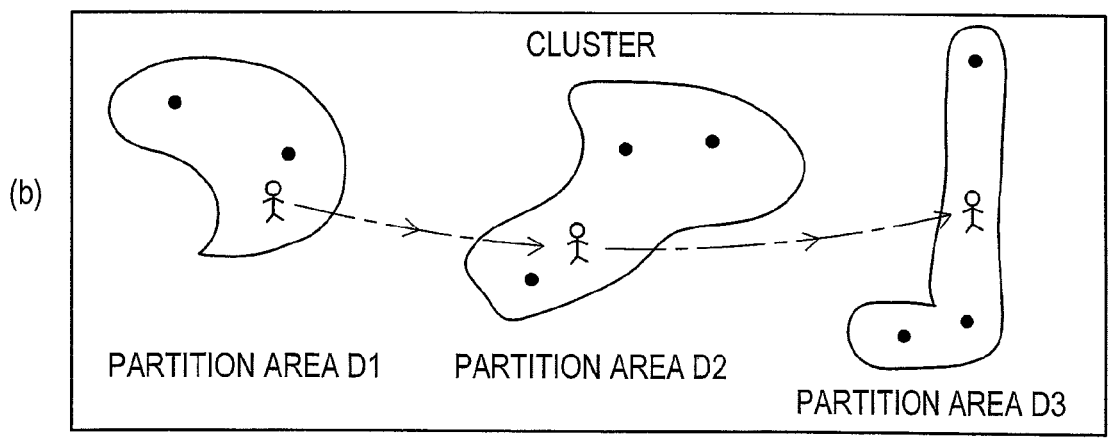
FIG. 8(a) is a conceptual drawing showing a second example of a configuration of cluster data as downloaded from the server at Step S8 as shown in FIG. 3.
FIG. 8(b) is a plan view showing one example of a conceptual location on the map for a group including partition areas D1, D2 and D3 as shown in FIG. 8(a).

As shown in FIG. 7 and FIG. 8, data showing one reference area and data showing one set of tourist information (this can include at least one item of azimuth angle specific tourist information (to be described later) either individually or together with other related information, or a minimum unit of tourist information can include one or more types of messages) are correlated with each other to constitute one element data set. A plurality of element data sets are allocated to one partition area and the plurality of element data sets constitute one block. Specifically, one partition area corresponds to one block.

Thus, a plurality of blocks are allocated to the above-mentioned overall map and a portion of these blocks are clustered together to form one cluster. The data showing one cluster is the above-described cluster data and includes data indicating a plurality of reference areas belonging to that cluster and data indicating a plurality of tourist information items correlated with the respective reference areas.

In a first clustering example as shown in FIG. 7, one block No. 1 constitutes one cluster. Accordingly, in the first example, one partition area D1 corresponds to one cluster and one block No. 1 corresponds to the partition area D1.

On the other hand, in a second clustering example as shown in FIG. 8, three blocks, block No. 1, block No. 2 and block No. 3 constitute one cluster. Thus, in the second example, three partition areas D1, D2 and D3 correspond to one cluster and in turn, three blocks, block No. 1, block No. 2 and block No. 3 correspond to partition areas D1, D2 and D3, respectively.

In the second example, the three partition areas D1, D2 and D3 which belong to one cluster may be located adjacent to each other geographically speaking, but may also be scattered away from each other geographically speaking, as shown in FIG. 8(b).

When employing clustering as shown in FIG. 8, if, for instance, users go sightseeing according to the schedule of a sightseeing tour (for instance, sightseeing tours which require large scale transfers using transportation such as train, bus, plane, ship, etc.) which is planned in advance and are scheduled to tour a plurality of target objects which are scattered geographically speaking (for instance, across more than one country) in a certain order, the partition areas corresponding to these target objects can be gathered into one cluster.

When employing clustering, one cluster can cover one sightseeing tour. On the other hand, once the data base 26 receives a download request from the terminal 20, as long as the user's current location is located within any partition area covered by the sightseeing tour, the server 24 can transmit to the terminal 20, in a lump, cluster data indicating a cluster corresponding to that sightseeing tour, more specifically, data showing a plurality of tourist information items as well as a plurality of reference areas corresponding to a plurality of partition areas covered by the sightseeing tour.

Thus, if at least one download is possible from the server 24 during the sightseeing tour, the terminal 20 can download all the tourist information required for the sightseeing tour.

Thus, as long as connection with the server 24 can be established at any one location from the plurality of partition areas covered by the sightseeing tour, even if the download from the server 24 is carried out in any of the partition areas, terminal 20 can retrieve, in any partition area, tourist information suitable for that partition area. As a result, the user can acquire tourist information suitable for the current location at any time during the tour irrespective of the current location, more specifically, irrespective of whether connection with the server 24 is established or not.

For instance, in case of traveling by ship while stopping at a plurality of ports, the terminal 20 is unable to communicate with server 24 as moving further away from the nearest base station 22 while at sea, however, the GPS receiver 48 and the azimuth angle sensor 49 operate normally. Accordingly, when at port, the terminal 20 may communicate with the server 24 to download tourist information corresponding to the tourist area scheduled for visiting. Thus, when the user captures an image of a tourist area he/she will visit later (for instance, geographical features such as the seashore which can be seen from aboard), the terminal 20 can retrieve the tourist information corresponding to that tourist area and provide it to the user even if communication with the server 24 is impossible until next stop at port.

FIG. 9 shows a conceptual configuration of cluster data which is downloaded from the server 24 into the terminal 20 and stored in the terminal data base 60.

The terminal data base 60 stores data indicating a plurality of reference areas and data indicating a plurality of tourist information items which are in a relationship of correlation. Data indicating each of the reference areas includes geographical coordinates data $(x_1, y_1)$ showing a point which is located in a first diagonal position and geographical coordinates data $(x_2, y_2)$ showing a point in a second diagonal position, among the four points defining a quadrangular reference area.

Figure 10:
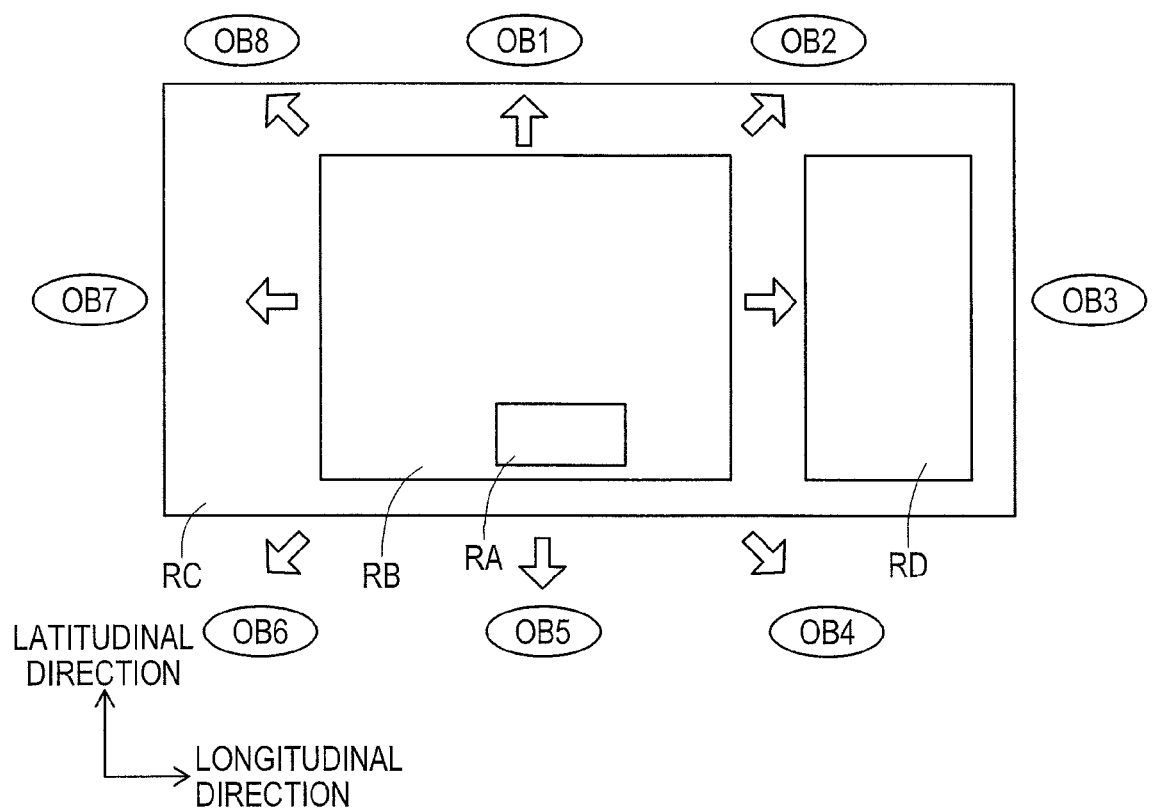
FIG. 10 is a plan view showing a plurality of reference areas stored in the terminal data base illustrated in FIG. 2 and target objects are correlated with azimuth angles in each reference area.

FIG. 10 is a plan view showing which of a plurality of reference areas stored in the terminal data base 60 have target objects OB correlated therewith for each azimuth angle. In this example, one tourist information set is correlated with one reference area and this tourist information set includes at least one item of azimuth angle specific tourist information. Reference areas RA, RB, RC and RD in the example shown in FIG. 10 are the same as the reference areas RA, RB, RC and RD shown in FIG. 6.

In the example shown in FIG. 10, the plane right above the sheet indicates true north (magnetic north) which is the reference azimuth, and target objects OB1, OB2, OB3, OB4, OB5, OB6, OB7 and OB8 which are each spaced apart from the reference azimuth by 45 degrees in a clockwise direction are allocated to one reference area RB. Each of the target objects OB1, OB2, OB3, OB4, OB5, OB6, OB7 and OB8 may be present, geographically speaking, at least partially inside the reference area RB or may not be present at all inside the reference area RB.

In the present embodiment, only one item of tourist information is allocated for the same reference area per azimuth angle. Accordingly, if any of the plurality of azimuth angles allocated to one reference area is selected, one item of tourist information is automatically selected.

FIG. 11 is a conceptual diagram showing the contents of the tourist information set representing one example of a configuration of cluster data as downloaded from the server 24 to the terminal 20.

In the example shown in FIG. 11, one tourist information set is correlated with each reference area. This tourist information set includes a plurality of azimuth angle specific tourist information items, and these azimuth angle specific tourist information items are correlated with a plurality of target objects, respectively as well as a plurality of azimuth angles, respectively.

Figure 12:
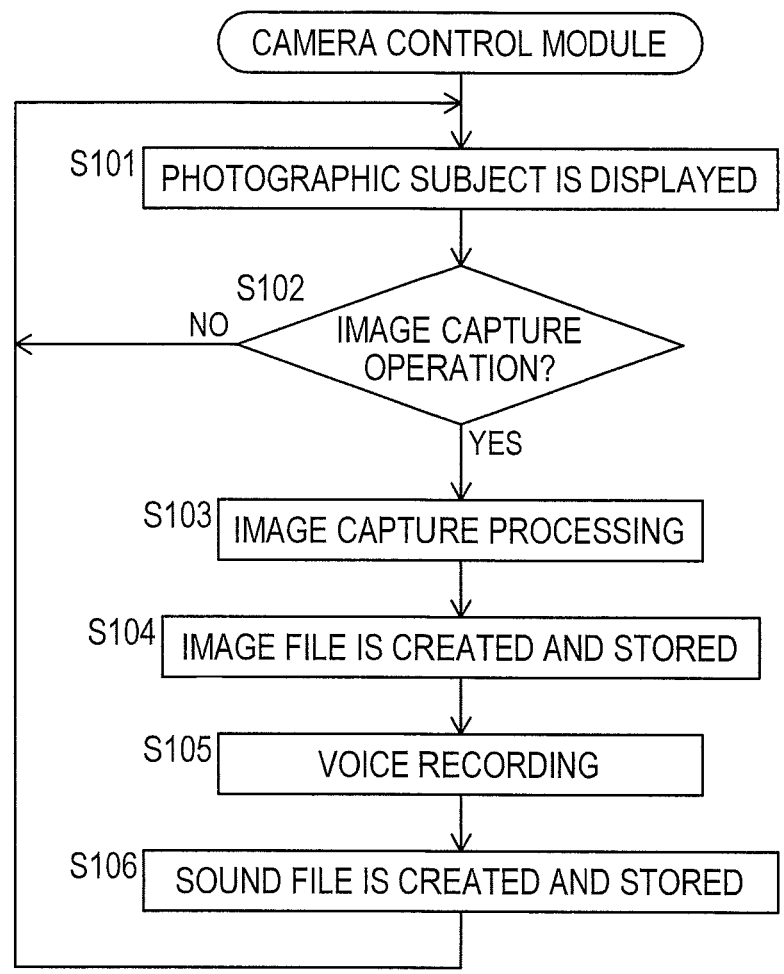
FIG. 12 is a conceptual flow chart showing the camera control module illustrated in FIG. 2.

FIG. 12 shows a conceptual flow chart of the above-described camera control module.

Once the camera control module is executed by the CPU 40, first, at Step S101, a target subject located in front of a camera 44 lens (not shown) is displayed on the screen 50 of terminal 20 as photographic subject. Next, at Step S102, the user's image capturing operation is awaited.

Once the image capturing operation is carried out, a predetermined image capture processing operation is carried out at Step 103. Next, an image file is created at Step S104 showing the image of the photographic subject as captured by the camera 44. The image file thus created is time tagged and is then stored at a predetermined location in the memory 42.

Thereafter, at Step S105, recording of surrounding sounds will start at a predetermined interval immediately after image capturing using the microphone. Next, an audio file indicating the sounds recorded by the microphone is created at Step S106. The audio file thus created is correlated with the image capture time and is then stored at a predetermined location in the memory 42.

As a result, the image file and the audio file created in response to the same image capture operation are correlated with each other through the same image capture time. Thus, in replay mode, the captured image and recorded voice are replayed in sync with each other on the image output device, specifically screen 50 and the audio output device, specifically the speakers, etc., respectively.

Thereafter, returning to Step S101, another image capturing operation by the user is next awaited at Step S102.

Figure 13:
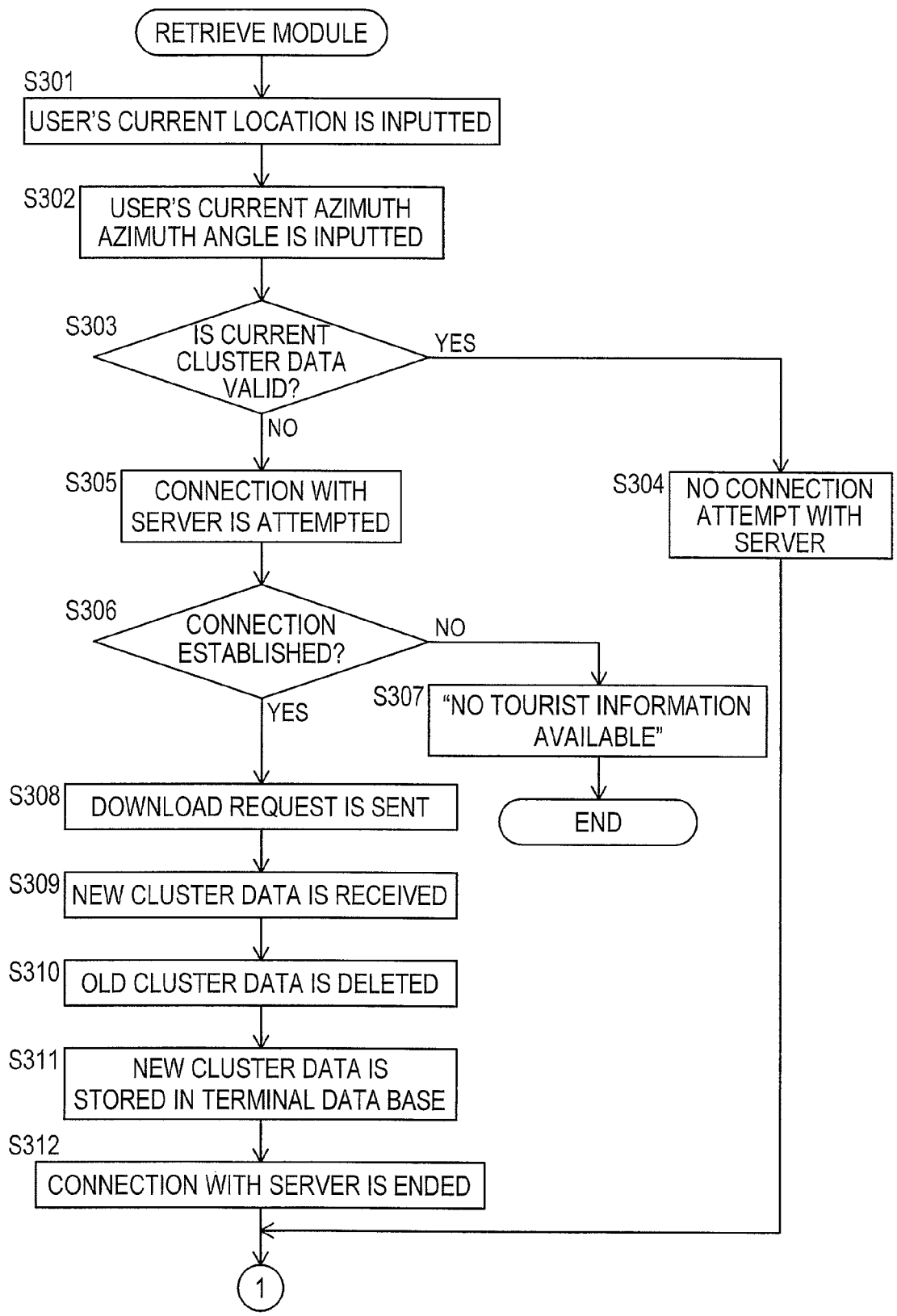
FIG. 13 is a conceptual flow chart showing the retrieve module illustrated in FIG. 2.
Figure 14:
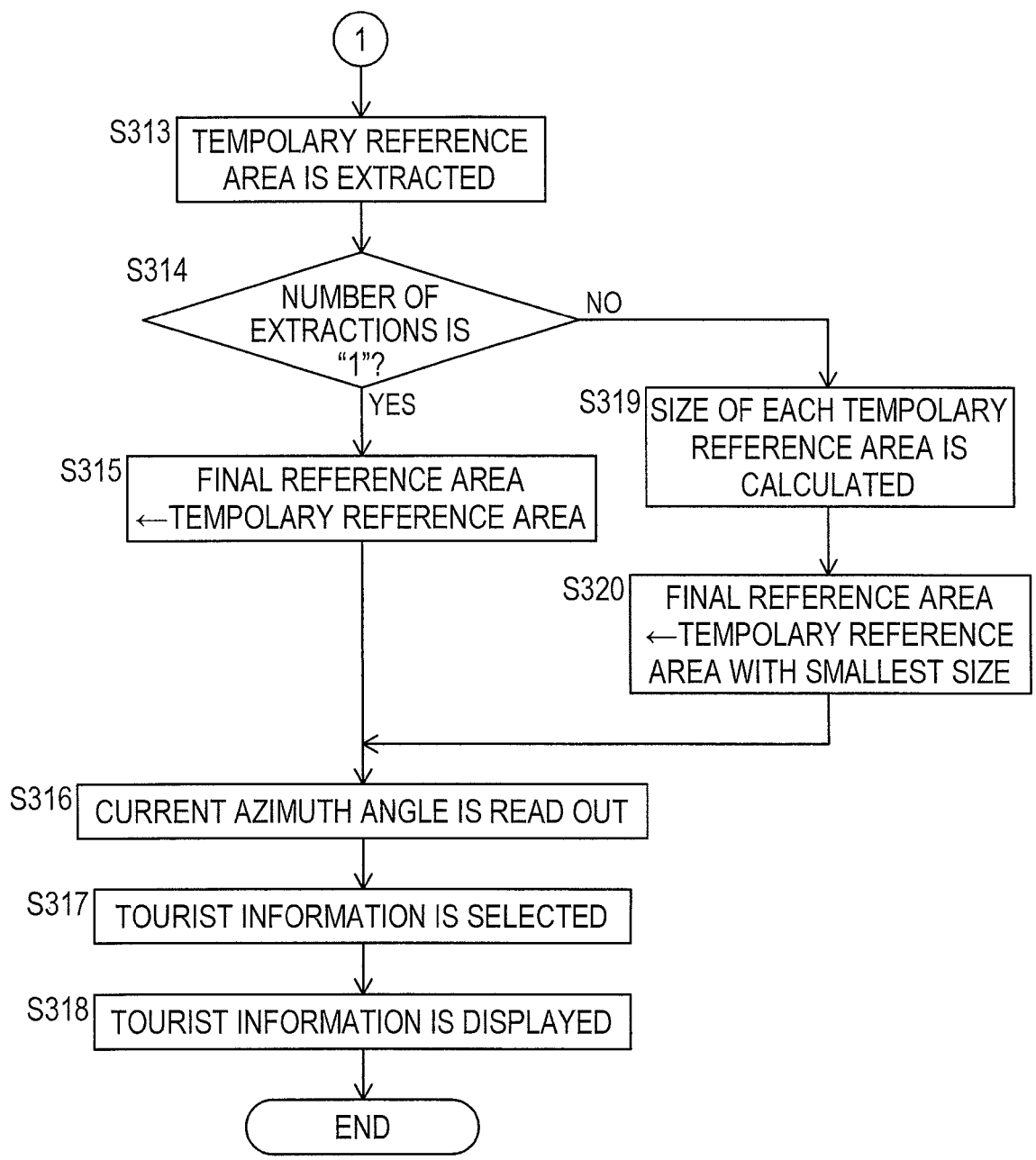
FIG. 14 is a conceptual flow chart showing a continuation of the retrieve module as shown in FIG. 2.

FIG. 13 and FIG. 14 show conceptual flow charts of the above-described retrieve module. This retrieve module is executed once the user's image capturing operation is detected at Step S4 as shown in FIG. 3, in order to carry out the operations at Steps S8 through S11.

Once the retrieve module is executed by the CPU 40, first, the user's current location as detected by the GPS receiver 48 (latest measurement result) is inputted from the memory 42 at Step S301.

Next, at Step S302, the current azimuth angle measured through execution of the azimuth angle measuring module is inputted from the memory 42. At this point, the user's location and azimuth angle immediately after the latest image capture operation carried out by the user are measured as the current location and current azimuth angle, respectively.

Next, at step S303, it is determined whether or not the cluster data currently stored in the terminal data base 60, more specifically the current cluster data is valid for the retrieval operation which is to be carried out next. More specifically, it is determined whether or not the user's current location is within the partition area corresponding to the current cluster data.

More specifically, in the present embodiment, in order to make calculation by the CPU 40 easier, it is determined whether or not the user's current location is found within any of the plurality of reference areas included in the current cluster data.

For instance, a determination is carried out with respect to at least one of the plurality of reference areas to confirm whether or not the longitude ($x_{user}$) of the current location is found within a longitudinal direction range (from $x_1$ to $y_2$) of a quadrangle in that reference area and the latitude ($y_{user}$) of the current location is found within a latitudinal direction range (from $y_1$ to $y_2$) of a quadrangle in the same reference area.

Next, assuming the current cluster data is valid, the result of the determination at Step S303 is positive (YES), and at the next Step S304, no attempt to connect with the server 24 will be made. Further, the flow will continue with Step S313 described in FIG. 14.

On the other hand, next, assuming the current cluster data is not valid, the result of the determination at Step 303 is negative (NO) and at the next Step S305, an attempt to connect with the server 24 will be made.

Then, at Step S306, it is determined whether or not connection with the server 24 has been established.

Further, assuming connection with the server 24 failed to be established, the result of the determination at Step S306 is negative (NO), and then, at Step S307 a message is displayed on the screen 50 reading "No tourist information available" as shown in FIG. 4(e). Thus, as no cluster data required for retrieval is found at the current location, it is impossible to retrieve the target tourist information. Accordingly, the current execution operation of the retrieve module is ended.

On the other hand, assuming that connection with the server 24 is successfully established, the result of the determination at Step S306 is positive (YES), and thereafter, at Step S308, the download request as described earlier is sent to the server 24.

Next, new cluster data is downloaded at Step S309 from the server 24 in response to the download request. The new cluster data is cluster data covering a partition area where the user's current location is found. Then, at Step S310, the old cluster data is deleted from the terminal data base 60.

Further, at Step S311, the newly downloaded cluster data is stored in the terminal data base 60. As a result, the old cluster data is substituted with the new cluster data in the terminal data base 60.

Next, connection with the server 24 is ended at Step S312.

In the present embodiment, download of new cluster data is not carried out even if the user's current location changes, as long as the user is located within an area where the current cluster data is valid. Accordingly, unnecessary cluster data downloads as well as frequent downloads can be avoided and as a result, the time the CPU 40 of terminal 20 is occupied with downloads of new cluster data can be shortened, expediting retrieval of tourist information by the CPU 40.

Then, at Step S313 shown in FIG. 14, the reference area where the user's current location is found is extracted as a temporary reference area from the plurality of reference areas indicated by the current cluster data stored in the terminal data base 60. Similar with Step S303, this extraction is also carried out by comparing the geographical coordinates values of each respective reference area with the geographical coordinates values of the user's current location.

Next, at Step S314, it is determined whether or not the number of extractions representing the number of reference areas as extracted at the preceding Step S313 is [1]. Assuming the number of extractions at this time is [1], the result of the determination at Step S314 is positive (YES) and then, at Step S315 it is determined that the current one temporary reference area corresponds to one final reference area.

Thereafter, at Step S316, the current azimuth angle is inputted from the memory 42. At the next Step 317, the azimuth angle specific tourist information to which an azimuth angle, which is closest to the current azimuth angle, is allocated is extracted from the plurality of azimuth angle specific tourist information items correlated with one final reference area as acquired as a result of execution of the preceding Step S315.

Then, at Step S318, the most suitable tourist information as extracted is displayed on the screen 50 of the terminal 20 as tourist information reflecting both the current location as well as the current azimuth angle.

On the other hand, assuming the number of extracted reference areas is not "1" but "2" or over, the result of the determination at Step S314 is NO and the flow shifts to Step S319.

At Step S319, the size of each of the plurality of temporary reference areas thus extracted is calculated. More specifically, the size of each temporary reference area is calculated while focusing on the fact that each temporary reference area is rectangular or square and the respective geographical coordinates values at two points in a diagonal position are already known, and then using these geographical coordinates values.

Thereafter, at Step S320, the temporary reference area with the smallest calculated size is selected as one final reference area from the plurality of temporary reference areas thus extracted. Then, the operation flow shifts to Step S316 where the tourist information correlated with the final reference area thus extracted is displayed on screen 50. This ends the current execution operation of this retrieve module.

Here, the execution contents of the retrieve module as described in detail while referring to FIG. 13 and FIG. 14 will be discussed in more detail.

For convenience of description, in the one example shown in FIG. 5, it is assumed that the tourist, as the user, moves in one region as shown in FIG. 5, from spot P1, to spot P2 and finally spot P3, in this order.

In the event the retrieve module is executed as shown in FIG. 13 and FIG. 14, when the tourist carries out the image capture operation at spot P1, reference area RA is extracted and, from amongst the plurality of azimuth angle specific tourist information items correlated to this reference area RA, the relevant tourist information corresponding to the current azimuth angle is displayed on the screen 50 of the terminal 20. At this time it is estimated that the target object A is the target object onto which the tourist is focusing at that time, and finally, the tourist information displayed on the screen 50 of the terminal 20 is the information showing the attributes of the estimated target object A.

Next, when the tourist carries out the image capture operation at spot P2, reference area RC is extracted and, from amongst the plurality of azimuth angle specific tourist information items correlated with that reference area RC, the tourist information corresponding to the current azimuth angle, specifically information showing the attributes of the estimated target object C is displayed on the screen 50 of the terminal 20.

Then, when the tourist carries out the image capture operation at spot P3, reference area RD is extracted and, from the plurality of azimuth angle specific tourist information items correlated to that reference area RD, the tourist information corresponding to the current azimuth angle, specifically information showing the attributes of the estimated target object D is displayed on the screen 50 of the terminal 20.

Thus, in the present embodiment, the tourist information which appears on the screen 50 of the terminal 20 changes momentarily each time an image capture operation is carried out as the tourist moves, in accordance with the current location of the tourist.

Furthermore, in the present embodiment, the tourist information correlated with the respective reference areas indicates the attributes of the target object correlated with that respective reference area.

More specifically, for instance, in the example shown in FIG. 5, if the target object C is a landform such as [Mount Fuji], tourist information correlated with that target object C is created so as to include information indicating, for instance, the geographical features, topographical features, scientific features, historic features, road guide, valuations, etc. for [Mount Fuji].

However, in contrast with this, the tourist information displayed on the display 50 of the terminal 20 may also be created so as to show the attributes of other target objects than the target object corresponding to the corresponding reference area.

More specifically, for instance, in the event the user stands at the present azimuth angle within the reference area corresponding to the tourist information displayed on the screen 50 of the terminal 20, settings may be changed so as to display tourist information with respect to target objects which the user can visually recognize in front of him on the screen 50 of the terminal 20.

More specifically, for instance, as shown in the example in FIG. 5, the target object A is the "Pinery of Miho" in Shizuoka City, Shizuoka Prefecture, which is a picturesque scenery commanding a view of Mount Fuji, and the target object C is a geographical feature such as "Mount Fuji". In this case, in an embodiment for carrying out the present invention, when the terminal 20 detects that the user stands within the reference area corresponding to target object A while pointing to almost true north, which triggers the user's image capture operation, tourist information with respect to target object C, instead of target object A is displayed on the screen 50 of the terminal 20.

Additionally, in the present embodiment, the CPU 40 in the terminal 20 and, in the memory 42, the unit adapted for storing the main control module, communication module, GPS control module, azimuth angle measuring module and retrieve module to be executed by CPU 40 constitute together a controller.

In this controller, the unit adapted to carry out Steps S5 and S6 as shown in FIG. 3 acts as a measuring unit, the unit adapted to carry out Step S9 as shown in the same drawing acts as an extraction unit, and the unit adapted to carry out steps S10 and S11 as shown in the same drawing acts as a providing unit. The extraction unit and providing unit constitute together a retrieving unit.

Also, in the controller, the unit adapted to carry out Steps S303 through S305 and Step S312 as shown in FIG. 13 acts as a communication permission/prohibition unit, the unit adapted to carry out Steps S306 through S309 as shown in the same drawing acts as a download unit, and the unit adapted to carry out steps S310 and S311 as shown in the same drawing acts as an overwriting unit.

Description of a Second Embodiment of the Invention

Next, a tourist information providing system 10 including a user portable terminal 20 (hereinafter referred to simply as "terminal") according to a second illustrative embodiment of the present invention will be described while referring to FIG. 15 through FIG. 21. In the present embodiment, some elements are the same as those in the user portable terminal 20 and tourist information providing system 10 according to the first embodiment and therefore they will be used with the same symbols or denomination and redundant description thereof will be omitted. A detailed description will be given only for elements which differ from those referred to in the preceding embodiment.

FIG. 15(a) describes one example of an environment wherein the terminal 20 according to the present embodiment operates. In this environment, at time $t_1$, the azimuth angle of a stationary target object $OB_2$ with respect to a user's location $TP_1$ is $\theta_1$. On the other hand, FIG. 15(b) shows that in the same operating environment, at the next time $t_2$, the azimuth angle of the same target object $OB_2$ with respect to a user's location $TP_2$ after he/she has changed location is $\theta_2$.

Thus, even if the target object OB onto which the user is focusing is a stationary object, once the location TP of the user focusing on that target object OB changes, the user's direction of line of sight, specifically the image capturing direction which is the direction of the camera 44 lens changes and the user's azimuth angle $\theta$ changes as well. More specifically, there is a positional dependence according to which the user's azimuth angle $\theta$ depends on the user's location TP even if the target object OB of interest is the same.

On the other hand, in the above-described first embodiment, the azimuth angle correlated with the respective azimuth angle specific tourist information and stored in the terminal data base 60, specifically the azimuth angle correlated with the respective target object is defined as a static azimuth angle $\Psi$ which does not change despite a change in the user's current location in time. This static azimuth angle $\Psi$ is the azimuth angle at the location of the corresponding target object with respect to the user's current location. This azimuth angle is acquired with respect to the user's direction of line of sight, in the case it is assumed that, irrespective of the user's current location, the user focuses on the corresponding target object from a set location (for instance, geometric central area inside a reference area) inside a reference area including the user's current location.

In the case of employing the first embodiment as described above, even if the azimuth angle which is closest to the user's current azimuth angle $\theta$ is selected from amongst the plurality of static azimuth angles $\Psi$ correlated with the plurality of target objects and stored in the terminal data base 60, it is likely that the target object corresponding to the static azimuth angle $\Psi$ thus selected may not coincide with the target object for which the tourist truly wishes to acquire tourist information.

Figure 16:
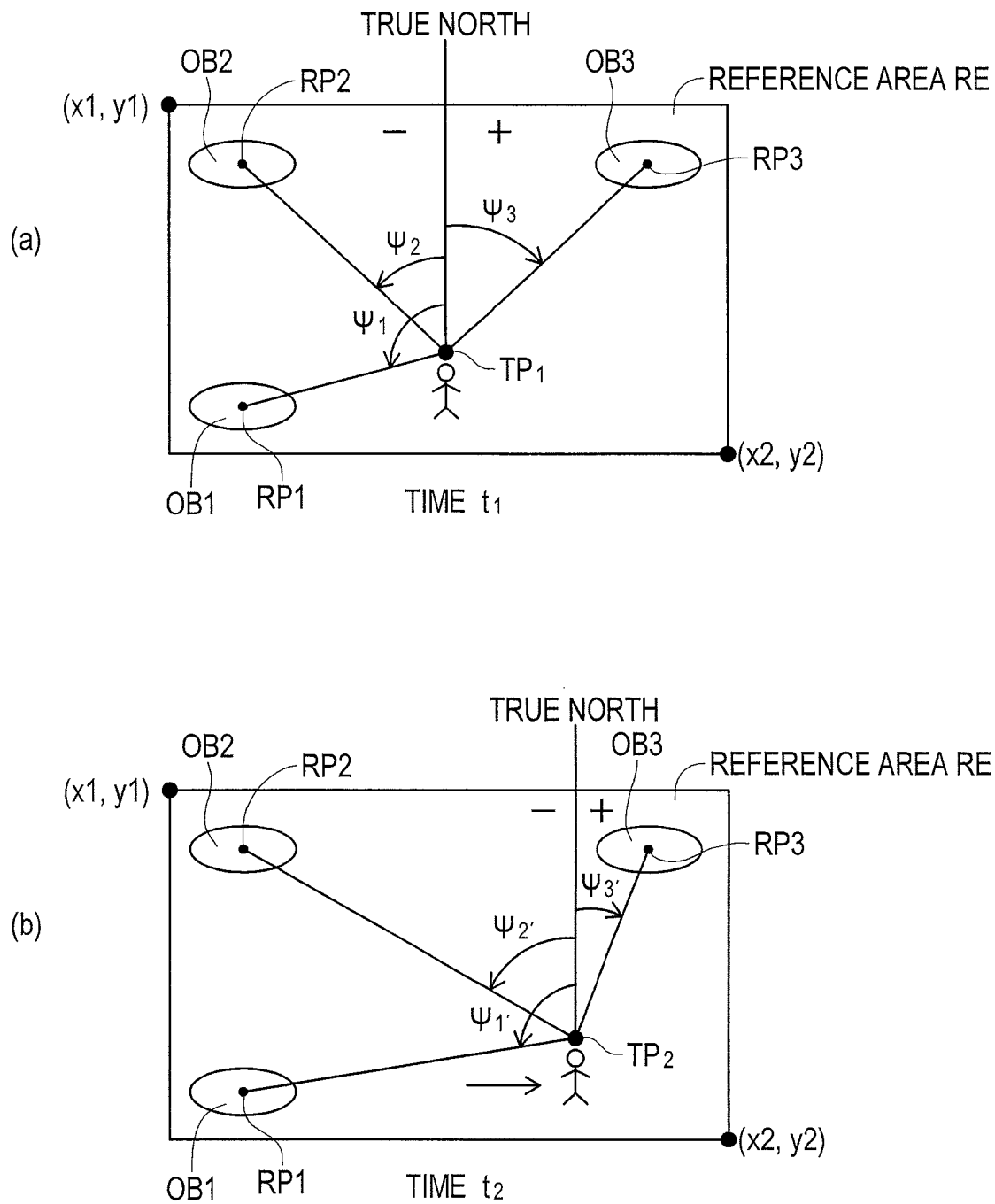
FIG. 16(a) describes how the azimuth angles stored in a reference table in the memory of the user portable terminal according to the second embodiment are automatically updated during operation of the user portable terminal as the user changes location. The diagram shows that the stored value of the azimuth angle of each respective stationary target objects $OB_{(i)}$ with respect to a user's location TP1 at a time $t_1$ is $\psi_{w}$. On the other hand.
FIG. 16(b) shows that at the next updated time $t_2$, the stored value of the azimuth angle for the same target objects $OB_{(j)}$ with respect to a user's location $TP_2$ after he/she has changed location changes to $\psi'_{(i)}$.

On the other hand, in the present embodiment, the plurality of azimuth angles $\Psi$ correlated with the plurality of target objects and stored in the terminal data base 60 are defined as dynamic azimuth angles which change in accordance with a change in the user's current location in time. These dynamic azimuth angles $\Psi$ represent the azimuth angles for the respective locations of the target objects (more accurately, the location of a reference point RP for each target object OB, as shown in FIG. 16) with respect to the user's current location. Specifically, this is the azimuth angle which is acquired with respect to the user's direction of line of sight in the case it is assumed that the user focuses on each target object (more appropriately, the reference point RP for each target object OB as shown in FIG. 16) from his/her current location, irrespective of the user's current direction of line of sight.

FIG. 16(a) describes how the dynamic azimuth angles $\Psi$ stored in a reference table (to be described later while referring to FIG. 19(a)) in the memory 42 of the terminal 20 according to the present embodiment are automatically updated during operation of the user portable terminal 20 as the user changes location. The diagram shows that at an updated time t1, the stored values of the azimuth angle of the respective stationary target objects $OB_{(i)}$ with respect to a user's location $TP_1$ are $\psi_{(i)}$. On the other hand, FIG. 16(b) shows that at the next updated time $t_2$, the stored values of the azimuth angle for the same target objects $OB_{(i)}$ with respect to a user's location $TP_2$ after he/she has changed location change to $\psi'_{(i)}$.

FIG. 17 is a plan view for describing a mechanism wherein the user portable terminal 20 according to the present embodiment calculates the latest value for the azimuth angle $\psi$ using the longitude and latitude degrees ($x_{RP}$, $y_{RP}$) of reference point RP for each target object OB as well as the longitude and latitude degrees ($x_{TP}$, $y_{TP}$) of the user's current location TP in order to update the value of the azimuth angle $\psi$ as stored in the reference table.

In the present embodiment, one right triangle is assumed for each target object OB on the map. This right triangle is defined by a straight line having the role of hypotenuse and connecting the reference point RP set as a fixed point in advance inside each target object OB and the user's current location TP and two more sides, one being parallel with the longitudinal direction and the other one being parallel with the latitudinal direction.

In this right triangle, the length of the hypotenuse is equal to distance D between the reference point RP and the user's current location TP. Also, of the other two sides, the length of the side parallel (hereinafter referred to as "base") to the latitudinal direction is expressed as ($y_{RP}$-$y_{TP}$), and the angle formed between the hypotenuse and the base is the dynamic azimuth angle v.

In accordance with Pythagoras's theorem, distance D can be calculated using the degrees of longitude and latitude of the reference point RP ($x_{RP}$, $y_{RP}$) and the degrees of longitude and latitude of the user's current location TP ($x_{TP}$, $y_{TP}$).

The dynamic azimuth angle $\psi$ can be calculated with the following expression, using the right triangle.

$$\Psi = \cos^{-1}((y_{RP}-y_{TP})/D)$$

The dynamic azimuth angle $\psi$ can be calculated using only the coordinate values for 2 points because once the location of these two points is determined, a unique right triangle is defined on a longitude and latitude coordinate system due to the constraint condition that two sides other than the hypotenuse are parallel to the longitudinal and latitudinal directions.

As shown in FIG. 18, in the present embodiment, one item of cluster data downloaded from the server 24 to the terminal 20 includes a plurality of target object specific tourist information sets per each reference area. Each target object specific tourist information set comprises an identifier for the corresponding target object OB, degrees of longitude and latitude for the reference point RP as set for that target object OB, and target object specific tourist information TI as allocated to that target object OB. The cluster data having this configuration is stored in the terminal data base 60, thus creating the aforementioned reference table.

The target object specific tourist information TI means literally the tourist information specific for each target object. However, if considering that this information is correlated with the dynamic azimuth angles ψ and then stored in the aforementioned reference table in the terminal data base 60, this information refers to tourist information specific for each dynamic azimuth angle ψ.

Figure 19:
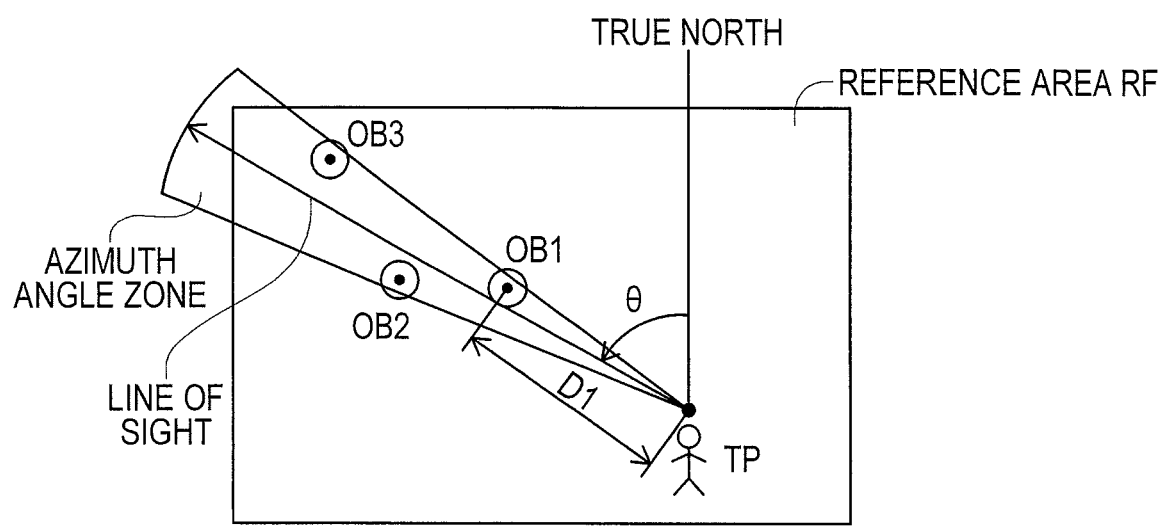
FIG. 19 is a conceptual diagram showing an example of how in case a plurality of target objects are present inside one azimuth angle zone in the user portable terminal according to the second embodiment, one of these target objects is automatically selected as the most suitable target object.

In the present embodiment, once any one of the plurality of reference areas stored in the reference table is selected as the current reference area suitable for the user's current location TP, the dynamic azimuth angle ψ and the distance D are calculated with respect to a each of a plurality of target objects correlated to the current reference area. Thereafter, as shown in FIG. 19, the dynamic azimuth angle v and distance D thus calculated are added to the reference table as shown in FIG. 19.

Furthermore, once the variation in the user's current location TP as compared to his/her location at a predetermined time earlier exceeds a predetermined value while the same reference area continues to be valid, the dynamic azimuth angle w and distance D are recalculated with respect to the same reference area. As a result, the reference table is automatically updated as far as the dynamic azimuth angle ψ and distance D are concerned in accordance with the change in user's location.

In the first embodiment as described earlier, only one item of azimuth angle specific tourist information is allocated for the same reference area for each azimuth angle. Thus, if any one azimuth angle is selected from the plurality of azimuth angles allocated to one reference area, one item of azimuth angle specific tourist information is automatically selected.

In the present embodiment, similarly for the most part with the first embodiment described earlier, it is determined that of the plurality of target objects correlated with the reference area corresponding to the user's current location TP, specifically the current reference area, the target objects which are correlated with the dynamic azimuth angle ψ which has a margin of error with the user's current azimuth angle θ that is within a set range and are then stored in the reference table are likely to be the target objects for which the user wishes to acquire tourist information.

This process is equivalent to a process wherein it is assumed that one azimuth angle zone exists which extends from the user's current location TP radially in the direction of the current line of sight of the user, using the user's current location TP and the current azimuth angle θ. In this context, it is determined that of the plurality of target objects correlated to the reference area corresponding to the user's current location TP, the target objects located within the assumed azimuth angle zone are likely to be target objects for which the user wishes to acquire tourist information.

In the example shown in FIG. 19, three target objects OB1, OB2 and OB3 are present inside the azimuth angle zone and target object specific tourist information (as described earlier, equivalent with azimuth angle specific tourist information) is allocated to each of the target objects OB1, OB2 and OB3 respectively. The azimuth angle zone has a fan-like shape with a predetermined angle (for instance, 20 degrees).

If description is focused on comparison with the first embodiment described earlier, the illustrative scenario shown in FIG. 19 is equivalent to the scenario wherein a plurality of target object specific tourist information items are allocated to the same reference area for each azimuth angle. Thus, if no special measures are taken, any azimuth angle is selected from the plurality of azimuth angles allocated to one reference area, more specifically, even if one azimuth angle zone is identified, automatical selection of one target object as well as automatical selection of one item of target object specific tourist information cannot be carried out.

Thus, in the present embodiment, there are a plurality of target objects which are correlated to dynamic azimuth angle v having a margin of error with the user's current azimuth angle θ which is within a set range and then stored in the reference table, specifically, a plurality of target objects are present within one azimuth angle zone as defined by the user's current location TP and current azimuth angle θ. In this case, any target object from amongst these target objects is selected fully automatically as the most suitable target object without requiring the user's intervention at all, by referring to the distance between these target object and the user.

More specifically, as shown in FIG. 19, the target object from amongst these target objects whose distance D with the user is shortest is automatically selected as the current target object. In the example shown in FIG. 19, the distance D1 between the target object OB1 and the user is shorter than the distance D2 and D3 between the other two target objects OB2 and OB3 and the user, respectively, and therefore, target object OB1 is selected as the current target object. As a result, target objects OB2 and OB3 located behind the target object OB1 with respect to the user's current location TP will be excluded from the current target objects.

Furthermore, more specifically, in the present embodiment, of the plurality of target objects which are allocated to the current reference area, a target object which is correlated with the dynamic azimuth angle Ψ having a margin of error with the user's current azimuth angle θ that is within a set range and is then stored in the reference table is extracted as a temporary target object. If more than one temporary target objects are extracted, the target object with the shortest distance D from the user's current location is selected from the plurality of temporary target objects as the final target object and target object specific tourist information corresponding to the final target object thus selected is provided to the user.

Figure 20:
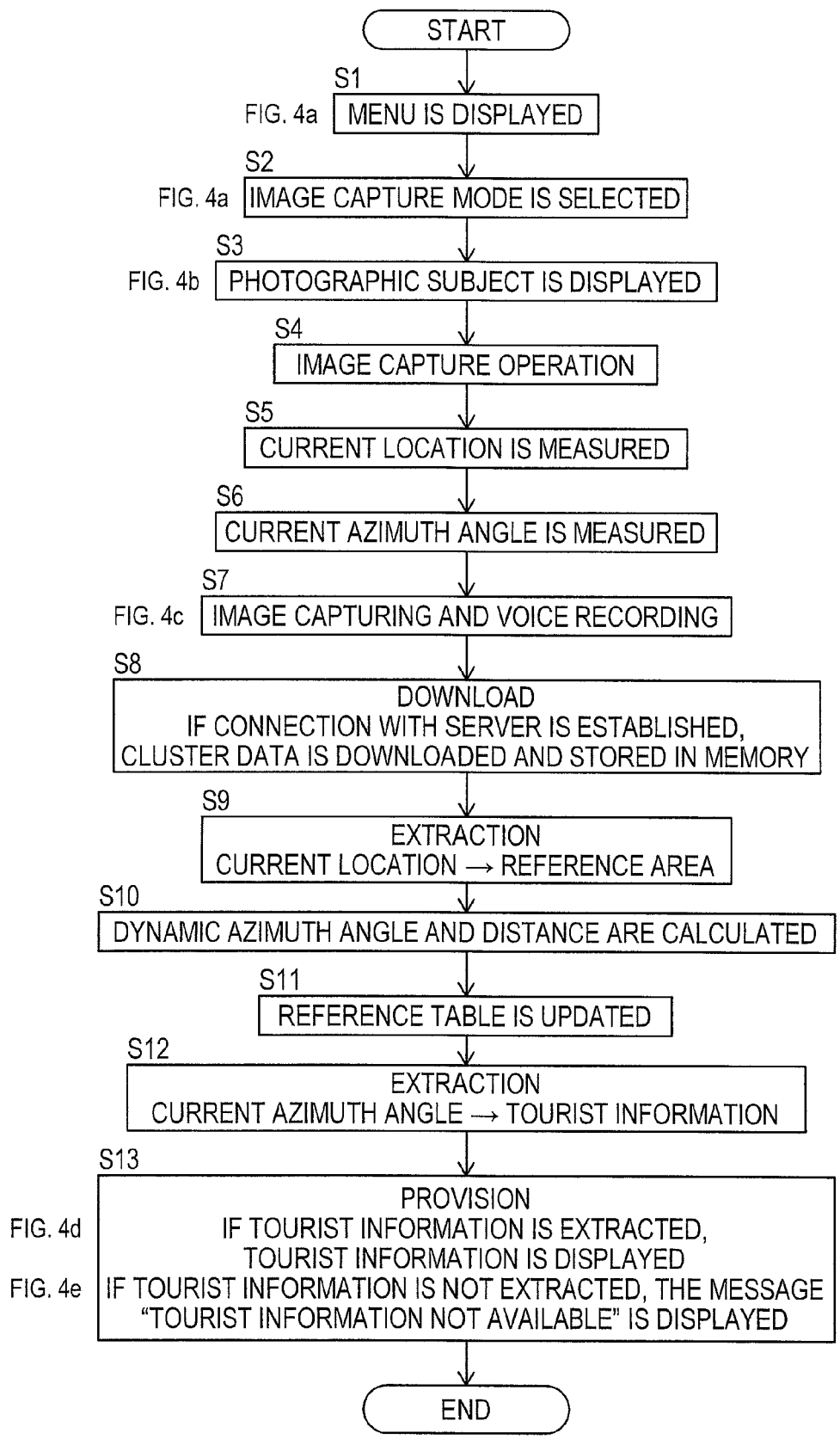
FIG. 20 is a flow chart for describing an outline of the overall operation in the user portable terminal according to the second embodiment; also, it is a conceptual flow chart showing a main portion of the main control module inside the user portable terminal.

FIG. 20 is a flow chart for describing an outline of the overall operation in the terminal 20; also, it is a conceptual flow chart showing a main portion of the main control module inside the terminal 20.

In this flow chart, the same steps as Steps S1 through S9 as shown in FIG. 3 are executed. Next, at Step S10, as described earlier, the dynamic azimuth angle Ψ and distance D are calculated with respect to at least one target object correlated to the reference area extracted at Step S9, using the degrees of longitude and latitude of the reference point RP ($x_{RP}$, $y_{RP}$) and the degrees of longitude and latitude ($x_{TP}$, $y_{TP}$) of the user's current location TP.

Thereafter, at Step S11, the above-described reference table is updated so as to reflect the dynamic azimuth angle Ψ and distance D thus calculated.

Next, at Step S12, one item of target object specific tourist information is extracted from the plurality of target objects specific tourist information items correlated to the current reference area so that the difference between the dynamic azimuth angle Ψ allocated to the one item of target object specific tourist information and the current azimuth angle θ of the user is equal to or lower than an allowable value set in advance.

Thereafter, similarly with Step S11 as shown in FIG. 3, at Step S13, the target object specific tourist information thus extracted is displayed on the screen 50 of the terminal 20.

Figure 21:
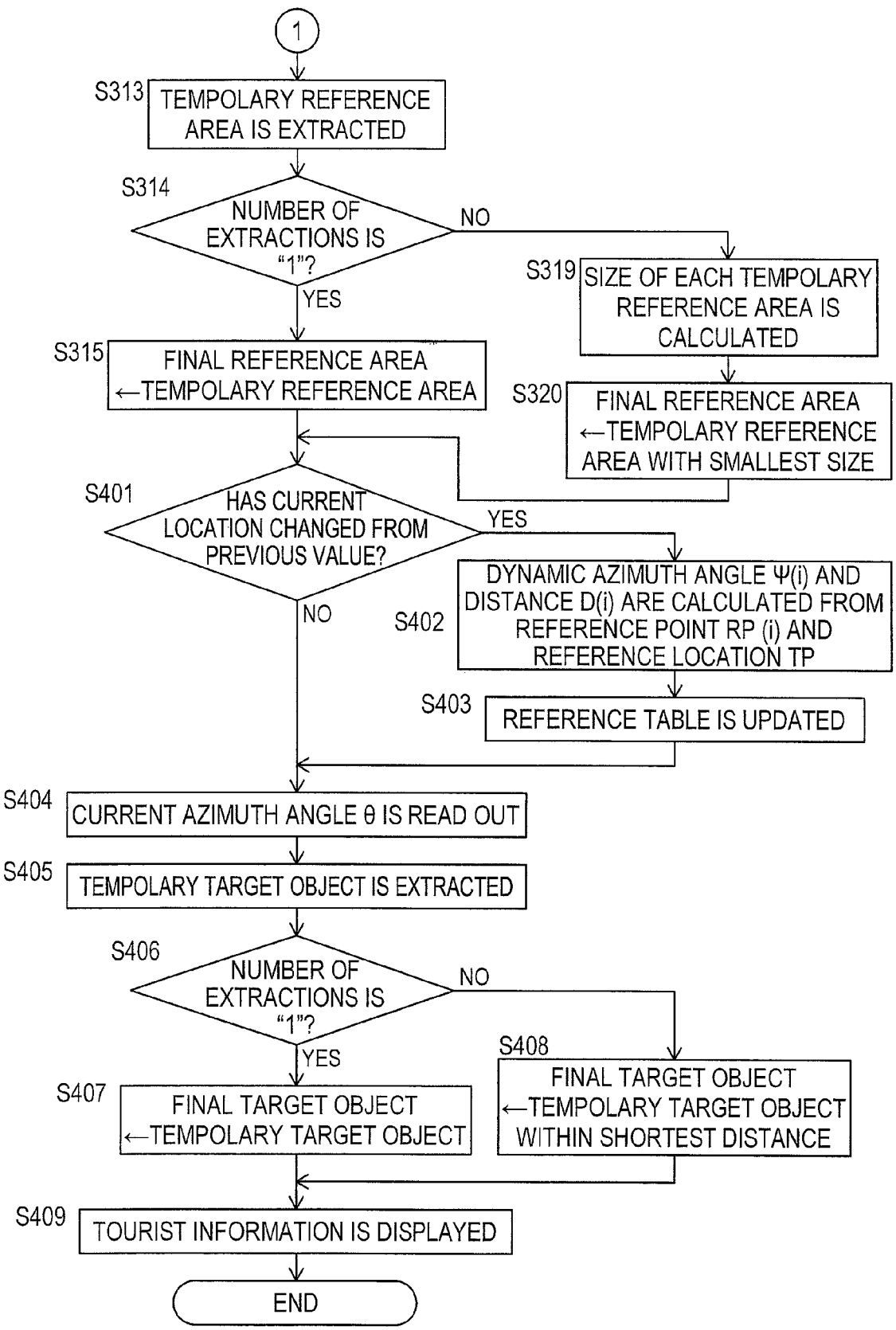
FIG. 21 is a conceptual flow chart for showing a portion of the retrieve module inside the user portable terminal according to the second embodiment, which corresponds to the portion illustrated in the flow chart in FIG. 14.

FIG. 21 is a conceptual flow chart for showing a portion of the retrieve module inside the terminal 20 corresponding to the portion illustrated in the flow chart FIG. 14.

In this retrieve module, the first half of the module which is not shown is common with the flow chart shown in FIG. 13 for describing the first embodiment. The second half of the module as shown in FIG. 21 also includes, in comparison with the flow chart shown in FIG. 14 for describing the first embodiment, Steps S401 through S409.

In the second half as shown in FIG. 21, Steps S313 through S320 are executed similarly with the first embodiment. Then, at Step S401, it is determined whether the user's current location TP has changed as compared to its previous value (current location TP a predetermined period of time earlier) by an amount equal to or exceeding the allowable value. Specifically, it is determined whether it is necessary to update the reference table as far as the dynamic azimuth angle Ψ and distance D are concerned.

Here, assuming that the user's current location TP has changed by an amount equal to or exceeding an allowable value as compared to its previous value (current location TP a predetermined period of time earlier), the result of the determination at Step S401 is positive (YES). Thus, at Step S402, the dynamic azimuth angle Ψ and distance D are calculated with respect to the final reference area extracted at Step S315 or S320, for every target object correlated therewith, using the degrees of longitude and latitude ($x_{RP}$, $y_{RP}$) for the reference point RP and the degrees of longitude and latitude ($x_{TP}$, $y_{TP}$) for the user's current location TP.

Thereafter, at Step S403, the reference table is updated so as to reflect the dynamic azimuth angle Ψ and distance D thus calculated. Next, the flow shifts to Step S404.

On the other hand, this time, assuming the user's current location TP does not change by an amount equal to or exceeding an allowable value as compared to its previous value (current location TP a predetermined period of time earlier), the result of the determination at Step S401 is negative (NO). The flow next shifts to Step S404.

In either case, at Step S404, the user's current azimuth angle θ is read out from the memory 42. Next, at Step S405, a dynamic azimuth angle Ψ having a margin of error with the user's current azimuth angle θ which is within a set range is extracted from the plurality of dynamic azimuth angles Ψ correlated with the current reference area, by comparing with the current azimuth angle θ thus read and the reference table. Also, the target object correlated with the extracted dynamic azimuth angle Ψ and stored in the reference table is extracted as the temporary target object.

Thereafter, at Step S406, it is determined whether the number of extractions representing the number of target objects as extracted at the preceding Step S405 is "1". Here, assuming the number of extractions is "1", the result of the determination at Step S406 is positive (YES). Thereafter, at Step S407, it is determined that the current one temporary target object is one final target object.

Next, at Step S409, the target object specific tourist information correlated with the one final target object as acquired in the preceding Step S407 is extracted as the most suitable tourist information and is then displayed on the screen 50 of the terminal 20.

On the other hand, assuming that the number of extracted target objects, specifically, the number of temporary target objects is not "1", but "2" or more, the result of the determination at Step S406 is negative (NO) and the flow shifts to Step S408.

At Step S408, a plurality of distances D between the extracted plurality of temporary target objects and the user's current location TP are read out from the reference table and the smallest value from the plurality of distances D thus read out is extracted. Furthermore, of the plurality of temporary target objects thus extracted, the temporary target object having the smallest extracted distance D is extracted as one final target object.

Next, shifting to Step S409, the target object specific tourist information correlated with the final target object as extracted is displayed on the screen 50 as the most suitable tourist information. Thus, this ends the current execution of the retrieve module.

In the present embodiment, if the result of the determination at Step S401 is positive (YES), prior to extraction of the temporary target object, calculation of distance D between each target object and the user's current location TP is carried out at Step S402 with respect to the current reference area. The result of the calculation is then reflected in the reference table.

Alternatively, the present invention can be implemented so that distances D are not calculated and stored in the reference table prior to extraction of the temporary target object, but, the distances D between the respective target objects and the user's current location TP are calculated for the first time at Step S408 for the current reference area. According to this aspect, as the reference table does not necessarily require an area for storing the distances D, its size can be reduced. Thus, the area in the memory 42, which is occupied by the reference table, is small in proportion to the number of target object specific tourist information sets it stores.

Description of a Third Embodiment of the Present Invention

Next, a tourist information providing system 10 including a user portable terminal 20 (hereinafter simply referred to as "terminal") according to a third illustrative embodiment of the present invention will be described while referring to FIG. 22 and FIG. 23. In the present embodiment, some elements are the same as those in the user portable terminal 20 and tourist information providing system 10 according to the first or second embodiment and therefore they will be used with the same symbols or denomination and redundant description thereof will be omitted. A detailed description will be given only for elements which differ from those referred to in the preceding embodiments.

In the above-described first and second embodiments, if the user selects the image capture mode, an image of the photographic subject is captured in response to the user's image capturing operation. Also, in parallel with this, tourist information corresponding to that photographic subject is automatically retrieved and provided to the user.

On the other hand, in the present embodiment, as the user does not wish to capture an image, but simply wishes to retrieve tourist information, specifically, desires only tourist information, and if he/she selected the above-described tourist information mode, the user holds the terminal 20 up to obstruct the view of the target object he/she is focusing on (and which may or may not become photographic subject in the future), and once the user carries out a predetermined operation with respect to terminal 20, tourist information corresponding to that particular target object is automatically retrieved and provided to the user.

Figure 22:
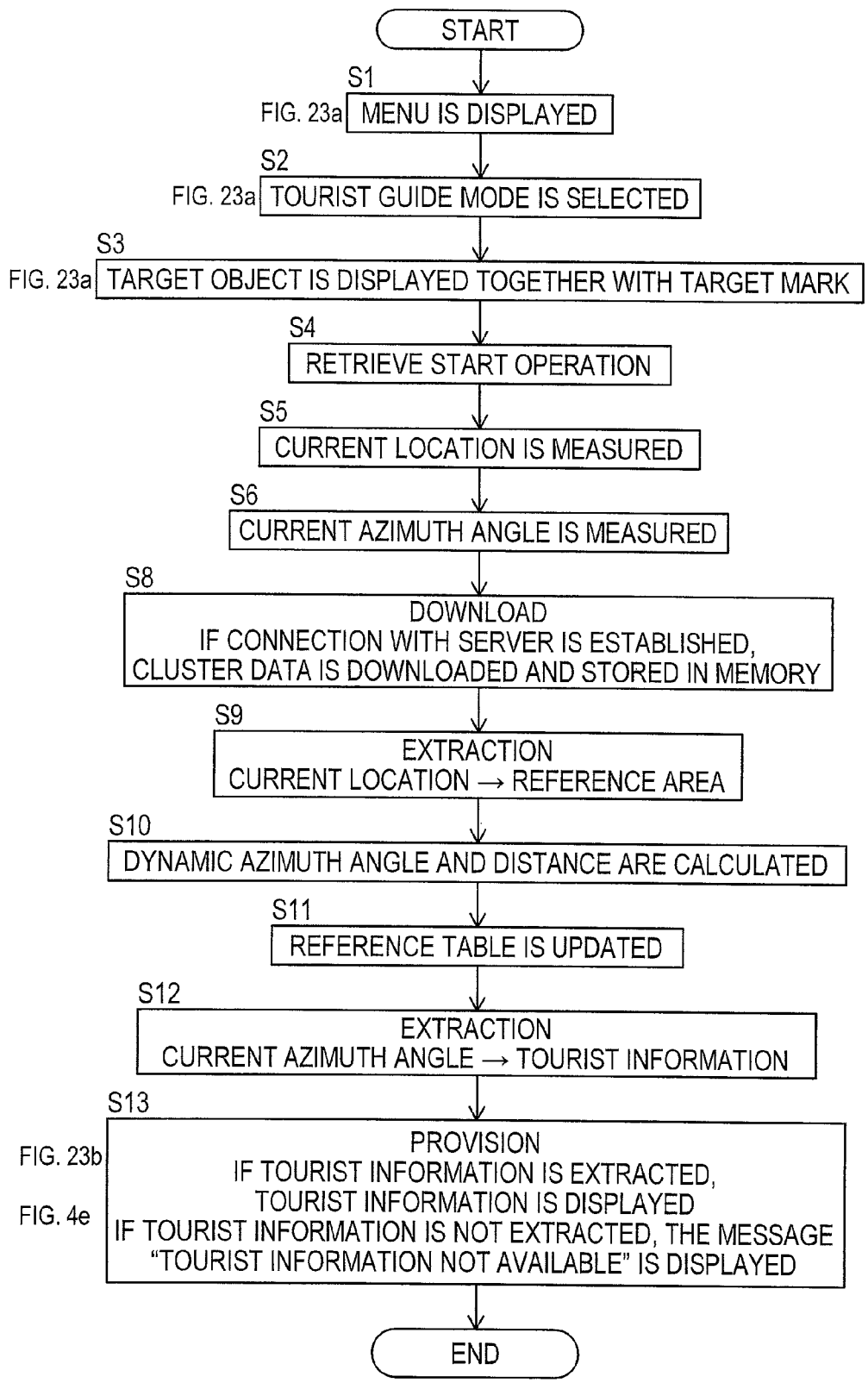
FIG. 22 is a flow chart for describing an outline of the overall operation in a user portable terminal according to a third illustrative embodiment of the present invention. This is also a conceptual flow chart showing a main portion of a main control module inside this user portable terminal.
Figure 23:
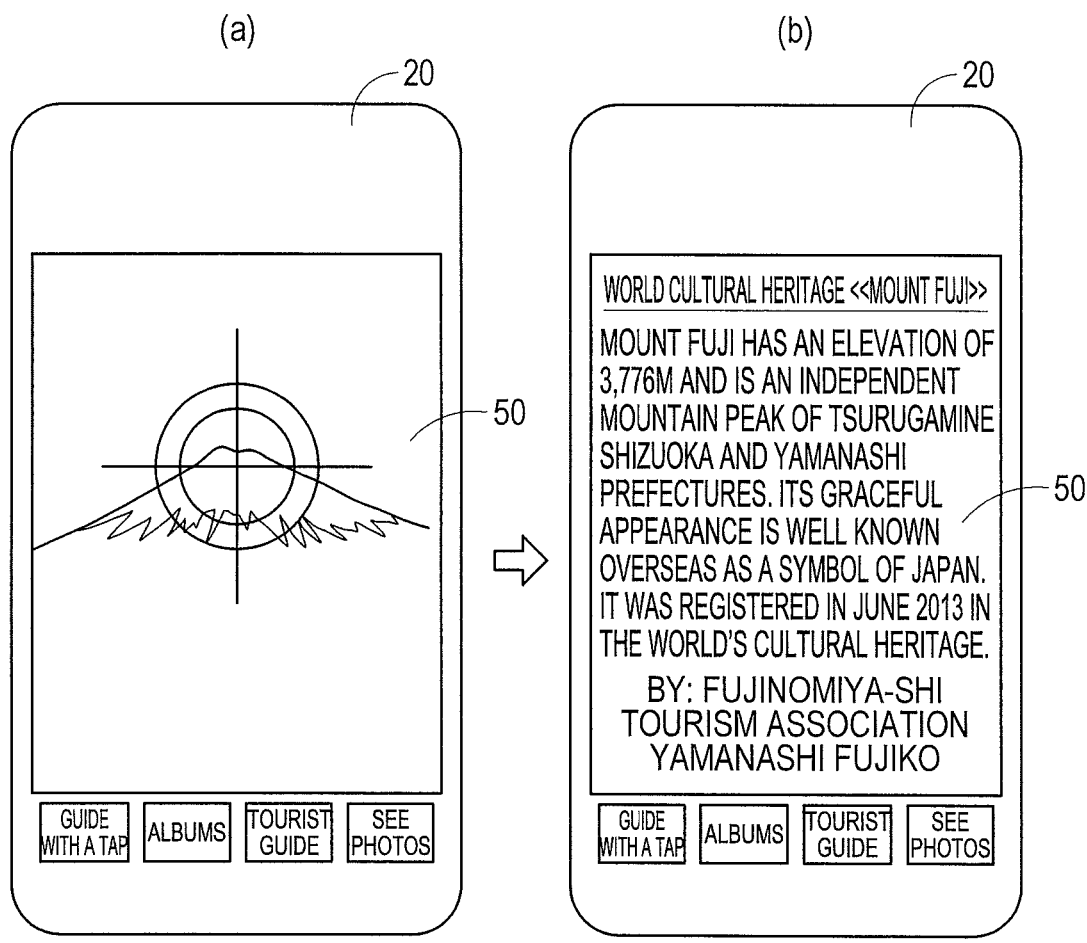
FIG. 23(a) and FIG. 23(b) are front views showing how contents displayed on the screen of the user portable terminal according to the third embodiment change during execution of one example of a retrieval operation in this user portable terminal from image showing the target object to text showing tourist information with respect to the target object.

FIG. 22 is a flow chart for describing an outline of the overall operation in the terminal 20 according to the present embodiment. This is also a conceptual flow chart showing a main portion of a main control module inside this terminal 20. The flow chart in FIG. 22 includes steps which are common with the flow chart in FIG. 20 and therefore, only steps which differ will be described in detail while referring to one operation example as illustrated in FIG. 23(a) and FIG. 23(b). FIG. 23(a) and FIG. 23(b) are front views showing how an image displayed on the screen changes during execution of one example of a retrieval operation in this terminal 20 from an image showing a target object to text showing tourist information with respect to that target object.

First at Step S1, an operation menu is displayed on the screen 50 as illustrated in FIG. 23(a). This operation menu includes icons and/or text showing a plurality of modes to be selected by the user. These modes include a tourist guide mode (shown in the drawing as "Tourist guide"), an image capture mode (shown in the drawing as "Guide with a tap"), replay mode (shown in the drawing as "See photos") and an albums mode (shown in the drawing as "Albums").

To give an outline of the tourist guide mode from amongst these modes, once the tourist guide mode is selected by the user, the target object towards which the camera 44 lens is pointing (specifically, the target object which is the target of the camera 44) is displayed on the screen 50. Once the user carries out a predetermined operation, for instance, an operation wherein the user taps the screen 50 at a predetermined spot, tourist information (for instance, tourist guide) suitable for that target object is displayed on the screen 50 in a timely fashion.

Next, once the user selects the tourist guide mode at Step S2, as illustrated in FIG. 23(a), an image showing the target object towards which the camera 44 lens is pointed is displayed on the screen 50 at Step S3, as illustrated in FIG. 23(a).

At Step S3, a target mark which is one example of a display showing the target location on camera 44 is displayed so as to overlap the image of the target object on the same screen 50. One example of this target mark is defined by a combination between a cross line constituted of a vertical line and horizontal line and a double concentric circle formed of an inside circle and an outside circle which are concentric with respect to the point of intersection of the cross line. It is recommended that the user aligns the target of the camera 44 with the target object so that the center of the target object is positioned on the vertical line of the target mark.

Next, once the user carries out a predetermined operation (for instance, the user taps the screen 50 on the target map spot), a user's retrieve start operation is detected at Step S4.

Thereafter, Step S5 and S6, and Steps S8 through S13 are executed similarly with Steps S5 and S6 and Steps S8 through S13 as shown in FIG. 20. As a result, the tourist information suitable for the current target object, specifically land form "Mount Fuji" is displayed on the screen 50 as shown in FIG. 23(b).

In the first and second embodiments described above, retrieval of the most suitable reference area and retrieval of the most suitable tourist information are started in conjunction with the user's image capture operation. On the other hand, in the third embodiment as described earlier, retrieval of the most suitable reference area as well as of the most suitable tourist information is started in response to the user's retrieval start operation.

Alternatively, the present invention can be implemented so as retrieval of the most suitable reference area as well as of the most suitable tourist information is started automatically whenever a predetermined condition is satisfied for instance, without using the user's operation as a direct trigger.

Such a condition can be set so as to be satisfied for instance, whenever a predetermined period of time has lapsed, whenever the nearest base station 22 changes, whenever communication with a new base station 22 is established, whenever a time interval for the user's image capture operation exceeds a predetermined value. In any of these cases, retrieval of the most suitable reference area and the most suitable tourist information can be started automatically without using the user's operation as a direct trigger.

Description of a Fourth Embodiment of the Present Invention

Next, a user portable terminal 20 (hereinafter simply referred to as "terminal") according to a fourth illustrative embodiment of the present invention will be described while referring to FIG. 24 and FIG. 25. In the present embodiment, some elements are the same as those in the user portable terminal 20 according to the first, second or third embodiment and therefore they will be used with the same symbols or denomination and redundant description thereof will be omitted. A detailed description will be given only for elements which differ from those referred to in the preceding embodiments.

As compared to the user portable terminal 20 according to the first, second or third embodiments, the terminal 20 according to the present embodiment also includes an evacuation site guide module (not shown). Thus, the terminal 20 according to the present embodiment includes a plurality of modes such as the above-mentioned tourist guide mode, image capture mode, replay mode, albums mode and file delete mode, and in addition, also includes an evacuation site guide mode.

When the user selects the evacuation site guide mode from these modes, the CPU 40 executes the evacuation site guide module. In response to this, the terminal 20 retrieves, from the plurality of evacuation sites on the map, the site which is closest to the user's current location and displays it to the user while offering visual support to the user to guide him/her to the target evacuation site. While receiving instructions to the target evacuation site, the user typically holds the terminal 20 at a position in front of his/her own chest so as to have the screen 50 more or less horizontal and the longitudinal direction of the screen 50 coincide with the user's travel direction. The screen 50 generally has a rectangular shape and its periphery is defined by a pair of long sides extending parallel to each other in a longitudinal direction, and a pair of short sides extending parallel to each other in the direction of the minor axis.

FIG. 24(a) and FIG. 24(b) are front views showing how the contents displayed on the screen 50 of a terminal 20 according to the present embodiment differ from each other during execution of an evacuation site guide mode before and after an evacuation site is selected as a target evacuation site. FIG. 25 is a flow chart for describing an overview of how the terminal 20 operates during execution of the evacuation site guide mode. This is also a conceptual flow chart showing an evacuation site guide module.

The terminal data base 60 inside the memory 42 can store a plurality of evacuation sites as correlated whit their respective location on the map. These evacuation sites include parks, schools, civic centers, etc. as shown in FIG. 24. The terminal data base 60 stores the name, location on the map (for instance, degree of longitude, degree of latitude) as well as other relevant information (for instance, category to which the evacuation sites belong, elevation, etc.) as attributes of the respective evacuation sites. This information as well is downloaded from the server 24 into the terminal 20 as a portion of the cluster data and is then stored in the memory 42.

Figure 25:
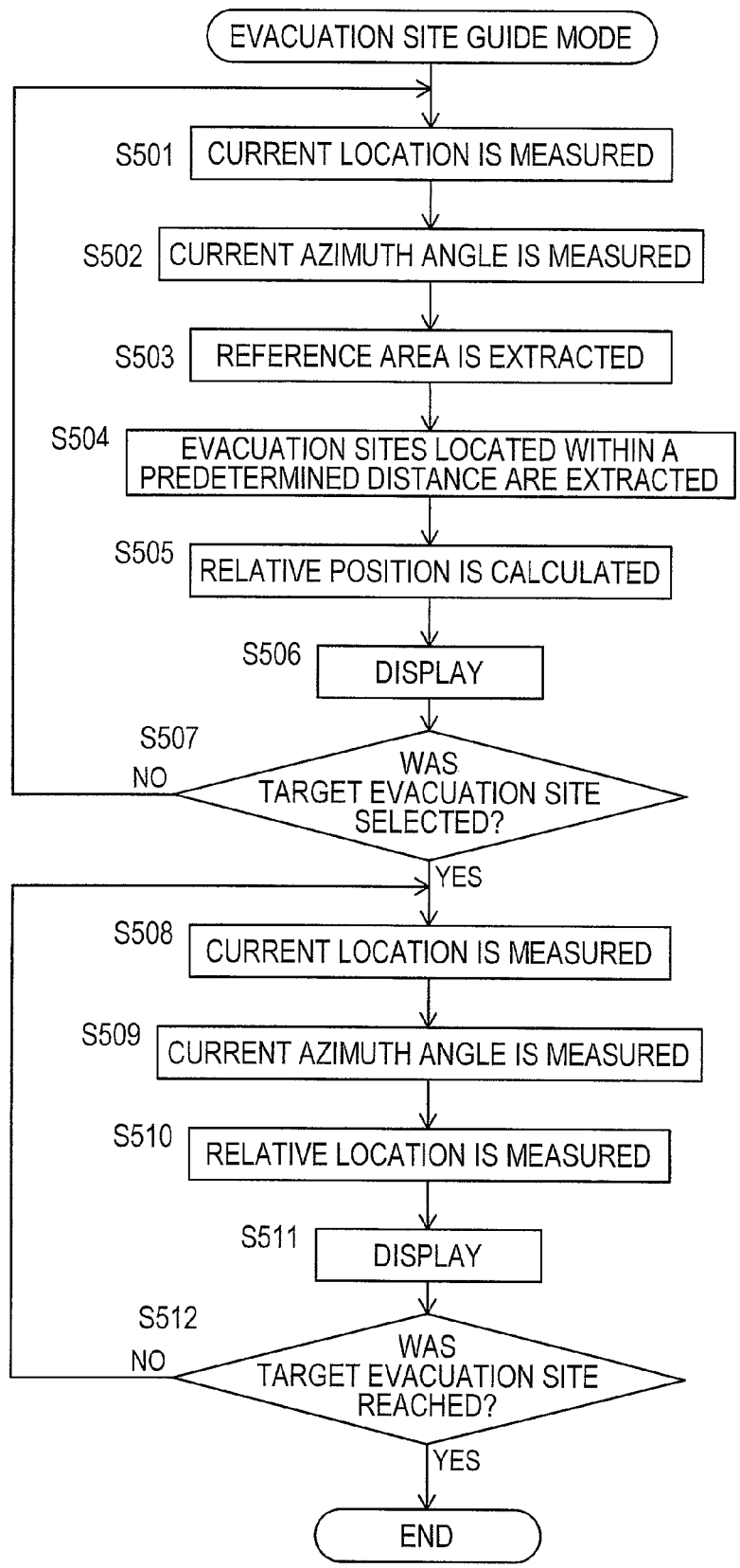
FIG. 25 is a flow chart for describing an overview of how the user portable terminal according to the fourth embodiment operates during execution of the evacuation site guide mode. This is also a conceptual flow chart showing an evacuation site guide module inside this user portable terminal.

Once the user selects the evacuation site guide mode, the evacuation site guide module as illustrated in the flow chart at FIG. 25, specifically, the evacuation site guide program is executed by the CPU 40.

More specifically, first, at Step S501, the GPS receiver 48 (one example of a measuring sensor) is used to measure the current location (longitude and latitude) of the terminal 20 on the map as the user's current location.

Next, at Step S502, despite the fact that orientation of the terminal 20 is fixedly set in the terminal 20 so as to show the user's travel direction, the azimuth angle sensor 49 is used to measure the azimuth angle on the map as the user's current azimuth angle.

Figure 24:
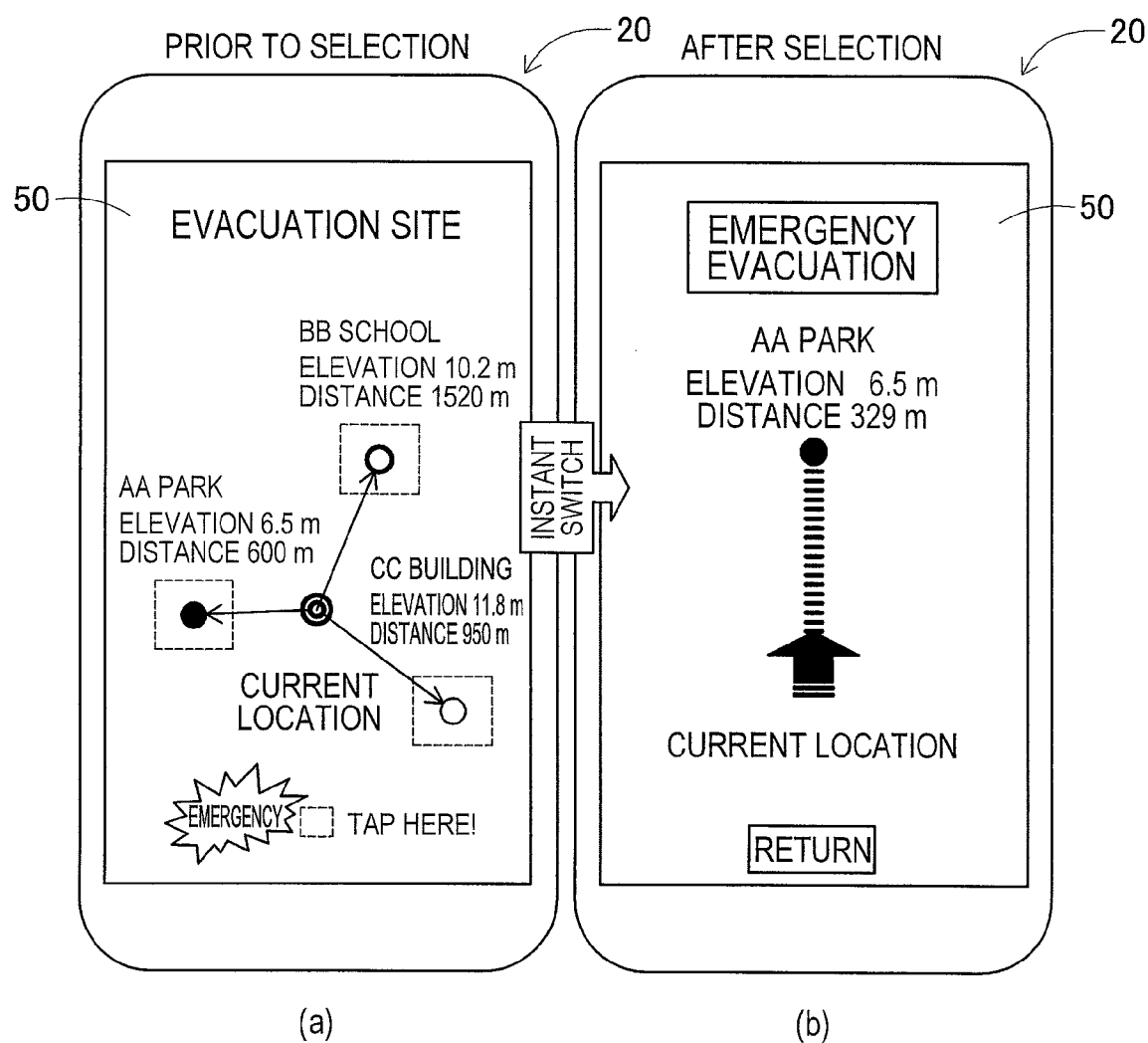
FIG. 24(a) and FIG. 24(b) are front views showing how the contents displayed on the screen of a user portable terminal according to a fourth illustrative embodiment of the present invention differ from each other during execution of an evacuation site guide mode before and after an evacuation site is selected as a target evacuation site.

One example of such orientation can include an upward orientation of the screen 50 in the case the user holds the terminal 20 in an upright position as shown in FIG. 24 (this corresponds to a forward orientation of the screen 50 in the case the user holds the terminal 20 in a horizontal position). Alternatively, such orientation can also include downward, rightward or leftward. It is required that the user moves (for instance, walks by himself or is transported by some moving body) while holding the terminal 20 in his/her hand so that the travel direction of his/her body coincides with the orientation of the terminal 20.

Next, at Step S503, similarly with Step S9 illustrated in FIG. 3, a reference area where the user's current location as measured is found is extracted from the plurality of reference areas.

Thereafter, at Step S504, a retrieval operation is carried out in the terminal data base 60 using the user's current location thus measured as a search key. Then, the evacuation sites located within a predetermined distance (for instance, 2 km) from the user's current location as measured are extracted as a plurality of candidate evacuation sites from the plurality of evacuation sites which are stored in the terminal data base 60 as correlated to the reference area thus extracted. The terminal data base 60 stores information relating to a plurality of evacuation sites for each reference area.

Next, at Step S505, the distance between the user's current location and each of the plurality of evacuation sites, and the relative position of each of the plurality of candidate evacuation sites as extracted on the map with respect to the user's current location are calculated based on the plurality of locations on the map, the user's current location and the user's current azimuth angle as correlated to the plurality of candidate evacuation sites thus extracted and stored in the terminal data base 60. As the user's current location and user's current azimuth angle are known, it can be anticipated which direction the user is headed with respect to the current location and the anticipated result is visualized on the map.

Thereafter, at Step S506, as illustrated in FIG. 24(a), the identification information indicating each of the plurality of candidate evacuation sites thus extracted is displayed altogether on the screen 50 in such a way as to show that, at the respective relative positions calculated with respect to the plurality of candidate reference sites thus extracted, the user's current location (shown in FIG. 24 as "the current location") coincides with the reference position (for instance, a central position on the screen 50 or a position slightly offset from this central position) set on the screen 50, and the orientation coincides with a reference line set on the screen 50 (for instance, a center line of the screen 50, indicating a line extending in a longitudinal direction of the screen 50, hereinafter referred to "longitudinal center line").

In the example shown in FIG. 24(a), the identification information for each candidate evacuation site includes the name of the target objects (such as for instance public facilities including parks, schools, civic centers, civic sports grounds, etc.) employed as evacuation sites, the category to which the target objects belong, ground elevation of the target objects, distance from the user's current location and their specific geometrical shape. The azimuth angle of each candidate evacuation site relative to the user's current azimuth angle (specifically, user's moving direction) is displayed on the screen 50 as an angle defined by a straight line connecting the displayed position of the current location with the displayed position of the respective candidate evacuation site, and the longitudinal center line of the screen 50.

Next, at Step S507, the user's operation to select one of the plurality of candidate evacuation sites thus displayed as the target evacuation site is awaited. The selection operation is carried out for instance, when the user touches any of the plurality of specific geometrical shapes (the specific geometrical shapes are enclosed by a frame shown by a dotted line) thus displayed on the screen 50, as illustrated in FIG. 24(a).

At a stage prior to the user selecting the target evacuation site, the flow returns to Step S501, but once the selection is made, the flow continues to Step S508.

At Step S508, similar with Step S501, the current location (longitude and latitude) of terminal 20 on the map is calculated as the user's current location by employing the GPS receiver 48 (as one example of a measuring sensor).

Next, at Step S509, similarly with Step S502, the azimuth angle of the direction of terminal 20 on the map is measured as the user's current azimuth angle by employing the azimuth angle sensor 49.

Next, at Step S510, the relative position of the selected target evacuation site on the map with respect to the user's current location is calculated based on the location on the map, the user's current location and the user's current azimuth angle as correlated to the target evacuation site thus selected and stored in the terminal data base 60.

Thereafter, at Step S511, as illustrated in FIG. 24(b), the identification information indicating the target evacuation site as selected is displayed on the screen 50 so that, at the relative position as calculated with respect to the target evacuation site thus selected, the user's current location coincides with a reference position (for instance, a center position on the screen 50 or a position slightly offset from this position) as set on the screen 50, and its direction coincides with a reference line (for instance, a longitudinal center line of the screen 50) set on the screen 50.

As a result, in the illustrative scenario shown in FIG. 24, once one of the three candidate evacuation sites thus displayed on the screen 50 is selected by the user as the target evacuation site, the display instantly switches from the display mode illustrated in FIG. 24(*a*) to the display mode illustrated in FIG. 24(*b*).

Here, immediately after the user has selected "AA Park" as the target evacuation site, with the user's location and azimuth angle in the state as shown in FIG. 24(*a*), the display will surely switch to the display mode illustrated in FIG. 24(*b*). However, immediately after switching, if the location and azimuth angle prior to the switch remain the same, the screen 50 will display only map information relating to "AA Park" and the "Current location", specifically, information indicating a geographical relative position relationship, as shown in FIG. 24(*a*).

Thereafter, once the user starts moving from the "current location" shown in FIG. 24(*a*) straight towards where "AA Park" really exists on the map, an image showing that "AA Park" really exists on the extended line in the travel direction of the body, specifically, exactly the image shown in FIG. 24(*b*) is displayed on the screen 50.

In the display mode shown in FIG. 24(*b*), the display 50 will momentarily display how, as the user moves, he/she will get closer to the target evacuation site location-wise as well as azimuth angle-wise, more specifically, distance-wise as well as angle-wise.

In the example shown in FIG. 24(*b*), character information such as "Emergency Evacuation" and an icon for "Return" are also displayed. Once the user touches that icon, a process is carried out to return to a predetermined page such as the page displaying the above-described operation menu.

In the example shown in FIG. 24(*b*), as the user's real travel direction coincides with the ideal travel direction to be selected for approaching the target evacuation site, the target evacuation site is displayed on the screen 50 at a position straight in front of the display position of the current location. Thus, it is possible to visually confirm, if the user continues to travel in the same direction, that he/she approaches and reaches the target evacuation site.

In the example shown in FIG. 24(*b*), the remaining distance from the current location to the target evacuation site is gradually displayed in numerical value. Also, the interval, in the user's real travel direction, from the user's ideal travel direction which is most suitable for completing the shortest route to the target evacuation site is gradually displayed as an angle defined by a straight line connecting the displayed position of the current location with the displayed position of the target evacuation site, and the longitudinal center line of screen 50.

Thereafter, at Step S512, it is determined whether the user's current location is where the target evacuation site is located on the map, specifically, whether the user has reached the target evacuation site, based on the relationship between the coordinates value (longitude and latitude) of the user's current location and the coordinates value (longitude and latitude) at the location of the target evacuation site on the map. If the destination is not reached, the flow returns to Step S508, whereas if the destination is reached, execution of this program is ended.

The foregoing detailed description is merely illustrative of some exemplary embodiments of the present invention based on the accompanying drawings and various modifications and improvements can be made by those skilled in the art starting from the invention as described in the "Disclosure of the Invention".

What is claimed is:

1. A user portable terminal for retrieving tourist information based on a current location of a user and providing such to the user, comprising:
    a camera for capturing an image of a target object;
    a measuring sensor for measuring the current location of the user on a map as a user's current location;
    an azimuth angle sensor for measuring an azimuth angle of a user's current line of sight on the map as a user's current azimuth angle;
    a memory capable of storing a plurality of tourist information and a plurality of reference areas allocated to a plurality of target objects on the map which are correlated with each other, wherein from the plurality of tourist information, tourist information which is correlated to each of the plurality of reference areas includes a plurality of azimuth angle specific tourist information correlated to a plurality of azimuth angles; and
    a retrieving unit adapted for retrieving in the memory using the user's current location which is measured by the measuring sensor as a search key, and then extracting, from the plurality of reference areas, a reference area where the user's current location is found, then extracting, from the plurality of azimuth angle specific tourist information which are correlated with the reference area which is extracted, an azimuth angle specific tourist information corresponding to the user's current azimuth angle, and finally providing the azimuth angle specific tourist information which is extracted to the user.

2. The user portable terminal according to claim 1, wherein an azimuth angle correlated with each of the plurality of azimuth angle specific tourist information and stored in the memory is defined as an azimuth angle at a location of a corresponding target object with respect to the user's current location.

3. The user portable terminal according to claim 1, wherein an azimuth angle correlated with each of the plurality of azimuth angle specific tourist information and stored in the memory is defined as a static azimuth angle which does not change in spite of a change in the user's current location in time.

4. The user portable terminal according to claim 3, wherein the static azimuth angle is an azimuth angle at a location of a corresponding target object with respect to the user's current location, and irrespective of a user's current location, in the case it is assumed that the user watches the corresponding target object from a set location within a reference area including the user's current location, it is defined as an azimuth angle which is acquired with respect to the direction of a user's line of sight.

5. The user portable terminal according to claim 1, wherein the azimuth angle correlated with each of the plurality of azimuth angle specific tourist information and stored in the memory is defined as a dynamic azimuth angle which changes according to a change in the user's current location in time.

6. The user portable terminal according to claim 5, wherein the dynamic azimuth angle is an azimuth angle at a location of a corresponding target object with respect to the user's current location, and irrespective of a user's current direction of line of sight, in the case it is assumed that the user watches the corresponding target object from the user's current location, it is defined as an azimuth angle which is acquired with respect to the direction of the user's line of sight.

7. The user portable terminal according to claim 1, wherein:

the plurality of target objects include a plurality of target objects located inside one azimuth angle zone which extends on the map from the user's current location radially along the direction of the user's current line of sight, and to which a plurality of azimuth angle specific tourist information allocated; and the retrieving unit estimates the azimuth angle zone from the user's current location and the user's current azimuth angle and if a plurality of target objects are present inside the estimated azimuth angle zone, it selects one target object from the plurality of target objects and provides azimuth angle specific tourist information allocated to the one target object to the user.

8. A program to be executed by a computer for actuating the user portable terminal according to claim 1.

9. A recording medium for storing the program according to claim 8 in a computer readable format.

\* \* \* \* \*